(12) United States Patent
Hashimoto et al.

(10) Patent No.: US 6,845,315 B2
(45) Date of Patent: Jan. 18, 2005

(54) ENGINE AIR-INTAKE CONTROL DEVICE AND ENGINE AIR-INTAKE CONTROL METHOD

(75) Inventors: Kohji Hashimoto, Tokyo (JP); Katsuya Nakamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/655,348

(22) Filed: Sep. 5, 2003

(65) Prior Publication Data

US 2004/0186659 A1 Sep. 23, 2004

(30) Foreign Application Priority Data

Mar. 19, 2003 (JP) .................................... P2003-076260

(51) Int. Cl.$^7$ ................................................ F02D 1/00
(52) U.S. Cl. ....................... 701/114; 701/115; 123/396; 123/399
(58) Field of Search ................................ 701/114, 110, 701/115; 123/399, 361, 396

(56) References Cited

U.S. PATENT DOCUMENTS

| 4,819,597 | A | * | 4/1989 | Gale et al. ................. | 123/399 |
| 5,235,951 | A | * | 8/1993 | Taguchi et al. ............. | 123/399 |
| 5,492,190 | A | * | 2/1996 | Yoshida ..................... | 180/65.4 |
| 6,411,872 | B1 | | 6/2002 | Fujita et al. | |
| 6,718,254 | B2 | * | 4/2004 | Hashimoto et al. ......... | 701/114 |
| 2004/0149260 | A1 | * | 8/2004 | Watanabe ..................... | 123/399 |

FOREIGN PATENT DOCUMENTS

| JP | 57-51932 A | 3/1982 |
| JP | 6-257493 A | 9/1994 |
| JP | 2000-97087 A | 4/2000 |
| JP | 2002-235598 A | 8/2002 |

\* cited by examiner

*Primary Examiner*—Hieu T. Vo
(74) *Attorney, Agent, or Firm*—Sughrue Mion, PLLC

(57) ABSTRACT

A drive control circuit generates a conduction drive output responsive to a detection output of an accelerator pedal depression degree sensor and an air-intake throttle-valve opening sensor, and controls a driving switch element connected to an air-intake throttle-valve opening control motor. A monitoring control circuit drives a control circuit power supply interruption element that closes a control power supply circuit of the driving switch element, and stops control operation of the driving switch element by a conduction-inhibit output. The drive control circuit can stop operation of a power supply interruption element by a feed-inhibit output. At the time of starting operation, a status signal determines activeness of the feed-inhibit output and conduction-inhibit output, after confirming that those outputs are normal, the inhibition is released. Thus, an engine air-take control device capable of reliably stopping the motor upon occurrence of any abnormality thereby improving safety in control is provided.

20 Claims, 16 Drawing Sheets

ENGINE AIR-INTAKE CONTROL DEVICE AND ENGINE AIR-INTAKE CONTROL METHOD

BACKGROUND OF THE INVENTION

1. Field of the Invention

The present invention relates to a drive control device of an intake valve open/close motor for controlling an air-intake of an engine. More specifically, the invention relates to improvement of an engine air-intake control device arranged such that a monitoring control circuit is added to a drive control circuit of the above-mentioned motor and a power feed with respect to the above-mentioned motor is interrupted at the time of occurrence of any abnormality.

2. Description of the Related Art

An air-intake control device that controls by means of an electromotive motor an air-intake throttle-valve opening of an engine in accordance with a depression degree of an accelerator pedal has been popularly employed in practical use. To improve safety in this type of electronic throttle control, however, a monitoring control circuit is usually added with respect to a drive control circuit of an electromotive motor, and the following control is implemented. In this control, a power feed to an electromotive motor is interrupted by means of a driving switch element and a power supply relay at the time of occurrence of any abnormality, and a throttle valve opening is mechanically returned to be in an initial state by means of a return spring.

According to the Japanese Patent Publication (unexamined) No. 097087/2000, "a throttle valve control device" is disclosed. In this throttle valve control device, throttle valve control means acting as a drive control circuit, main engine control means acting as a monitoring control circuit, and a motor power supply relay are used; the throttle valve control means and main engine control means include a mutual monitoring function and a self-diagnosis function; and the above-mentioned motor power supply relay is interrupted, and then a throttle valve opening is made to return to an initial position when a serious error is detected.

Besides, according to the Japanese Patent Publication (unexamined) No. 235598/2002, "a vehicle control device" is disclosed. In this vehicle control device, e.g., in the case where a microprocessor contained in an on-vehicle electronic device such as electronic throttle control device runs away, this trouble is detected by means of a watchdog timer to start up the microprocessor again; further, the fact that an error operation has occurred is stored in a storage element to interrupt a load relay for switching a load power supply such as throttle valve open/close motor.

This prior art was made intending to improve safety by an arrangement such that a motor power feed circuit continues to be in an interruption state until a power supply switch has once been interrupted although the microprocessor is immediately started up again in case of a temporary noise malfunction.

In the prior arts as described above, the drive control circuit controls an ON/OFF ratio of the driving switch element to control the amount of power feed with respect to the motor for controlling an intake valve opening of an engine, and opens a circuit of the driving switch element at the time of occurrence of any abnormality; as well as a power supply relay for the motor is also interrupted by the monitoring control circuit, so that a dual system is built up in both aspects of a control system and switching circuit system.

However, on the supposition that an improper soldering at an electronic substrate, getting mixed of a conductive foreign substance, breakdown of an electronic part or the like occur, any error takes place in a connection relation between the drive control circuit and the driving switch element and a connection relation between the monitoring control circuit and a power supply relay electromagnetic coil. Consequently, a problem exits in that a dangerous state occurs in which the drive/stop of the driving switch element or power supply relay is not always performed reliably.

SUMMARY OF THE INVENTION

A first object of the present invention is to provide an engine air-intake control device and an engine air-intake control method enabling to improve such problems as mentioned above, and to improve safety further by effectively utilizing a dual system constitution as well as rationalizing sharing of functions as a drive control circuit and a monitoring control circuit.

A second object of this invention is to provide an engine air-intake control device and an engine air-intake control method enabling to improve safety further by automatically conducting an operation confirmation of a safety control function at the start-up of operation.

An engine air-intake control device according to this invention includes:

a driving switch element that is connected in series to a motor, which controls an opening of an intake valve of an engine responsive to a detection output from an accelerator position sensor and a throttle position sensor, and controls a conduction current of the mentioned motor;

a power supply interruption element acting as a load circuit power supply interruption element connected to a power supply circuit of the motor, or as a control circuit power supply interruption element connected to a conduction controlling power supply circuit of the driving switch element;

a drive control circuit for generating a conduction drive output in order to control conduction to the driving switch element responsive to a detection output of the accelerator position sensor and the throttle position sensor;

a monitoring control circuit that is connected via a serial communication circuit with respect to the drive control circuit, and monitors operation of the drive control circuit; and status signal detection means for detecting an operation state of the driving switch element and the power supply interruption element, and for supplying a status signal corresponding to the operation state to the drive control circuit or the monitoring control circuit.

Furthermore, the drive control circuit and monitoring control circuit cooperate with each other in accordance with a detection result of the status signal detection means to generate in a sharing manner a feed drive output in order to bring the power supply interruption element into operation, a feed-inhibit output in order to make this feed drive output reactive, and a conduction-inhibit output in order to make the conduction drive output reactive. Thus, the foregoing outputs are caused to perform an operation stop or an operation permission of the power supply interruption element and driving switch element.

As a result, an advantage is obtained such that it becomes possible to reliably stop the drive of the motor, which controls the opening of the intake valve of the engine at the time of occurrence of any abnormality thereby enabling to improve safety in the control.

In addition, an engine air-intake control method according to this invention is an engine air-intake control method performed in the engine air-intake control device according to claim 1, wherein the drive control circuit and monitoring control circuit carry out the operation stop or operation permission of the power supply interruption element and driving switch element in a mutual sharing and cooperative manner in response to a status signal showing an operation state of the driving switch element that controls a conduction current of the motor, and the power supply interruption element that switches a power supply of the motor or a power supply of the control circuit.

As a result, another advantage is obtained such that it is possible to provide an engine air-intake control method enabling to reliably stop the drive of the motor at the time of occurrence of any abnormality, and to improve safety in the control.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
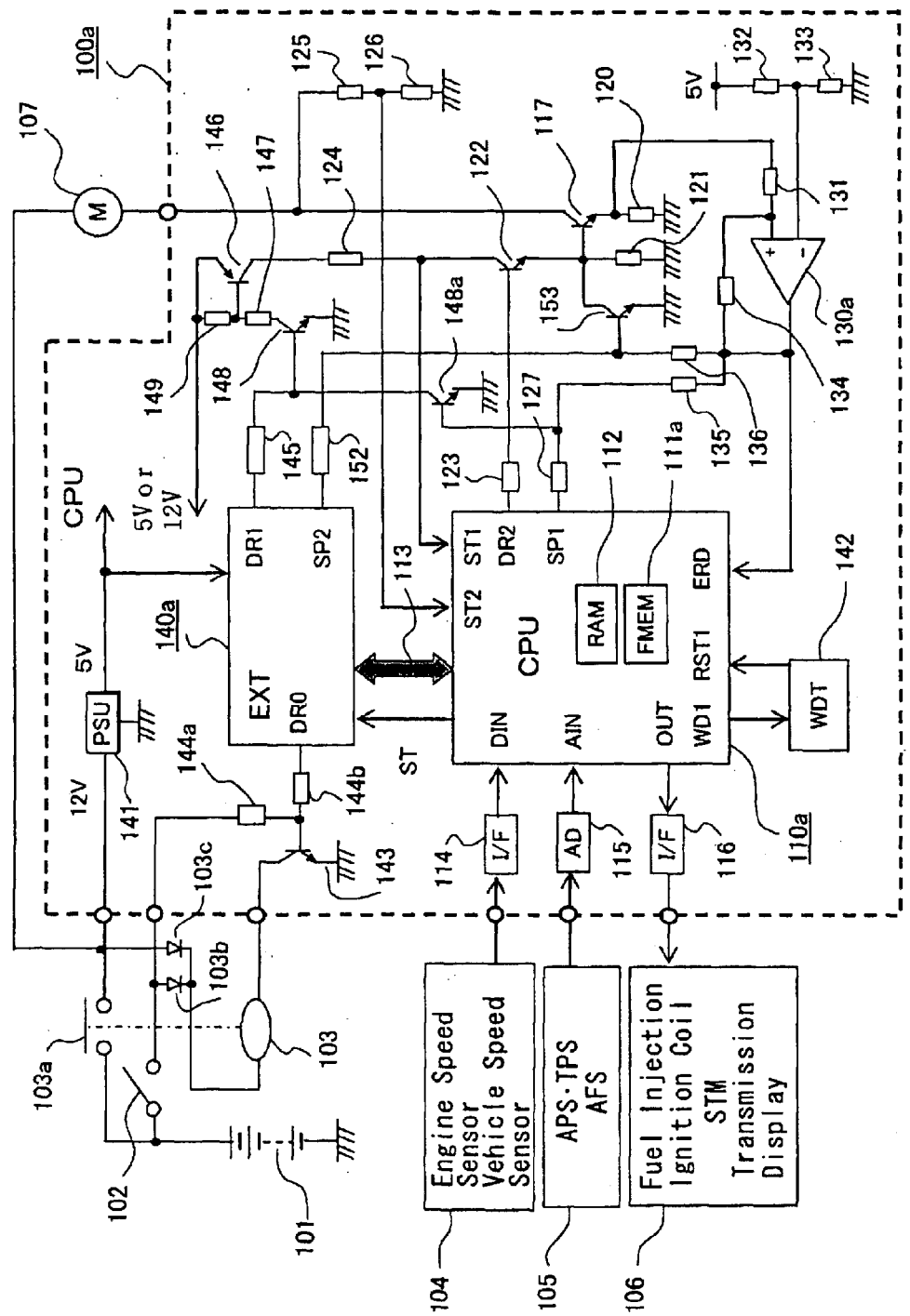
FIG. 1 is a block diagram showing constitution of an engine air-intake control device according to a first preferred embodiment.

Hereinafter, with reference to the drawings, several preferred embodiments of the present invention are described.

In addition, between respective figures, like reference numerals refer to the same or like parts.

Embodiment 1.

FIG. 1 is a block diagram showing constitution of an engine air-intake control device according to a first preferred embodiment of this invention.

With reference to FIG. 1, reference numeral 100$a$ designates an engine air-intake control device (hereinafter, merely abbreviated as "control device" as well) containing fuel injection control means and the like with respect to an on-vehicle engine. First external input/output apparatus connected via a connector, not shown, are described.

Numeral 101 designates an on-vehicle battery power supply (simply, also referred to as battery), for example, of 12V the negative-side terminal of which is connected to a vehicle body. Numeral 102 designates an power supply switch such as ignition switch connected between the forgoing battery and control device 100$a$.

Numeral 103 designates an electromagnetic coil. Numeral 103$a$ designates a switch contact that is brought into a closed circuit when the foregoing electromagnetic coil 103 is energized, and provides connection between the abovementioned battery 101 and the control device 100$a$. Further the electromagnetic coil 103 and switch contact 103$a$ form a power supply relay for switching a main power supply circuit of the above-mentioned control device 100$a$.

Moreover, the above-mentioned electromagnetic coil 103 is connected to the power supply switch 102 via a diode 103$b$, as well as to the switch contact 103$a$ via a diode 103$c$.

Numeral 104 designates a switch sensor group such as engine speed sensor, crank angle sensor, vehicle speed sensor. Numeral 105 designates an analog sensor group such as airflow sensor AFS for measuring an air-intake of a throttle, accelerator position sensor APS for measuring a depression degree of an accelerator pedal, throttle position sensor TPS for measuring a throttle valve opening. Numeral 106 designates an electrical load group such as ignition coil of an engine, fuel injection electromagnetic valve, stepping motor for driving an exhaust gas recirculation valve, gear level switching electromagnetic valve of a transmission, and various alarm displays, etc.

Furthermore, numeral 107 designates a motor performing an open/close drive of an intake valve of the engine. This motor is fed with an electric power from the battery 101 via the switch contact 103$a$ forming the foregoing power supply relay.

Now, an internal constitution of the control device (i.e., engine air-intake control device) 100$a$ is described.

Numeral 110$a$ designates a drive control circuit constituted so that a microprocessor CPU may be a main component. Numeral 111$a$ designates a program memory, specifically, a flash memory cooperating with the abovementioned microprocessor CPU. Numeral 112 designates an operation memory, specifically, a RAM memory cooperating with the above-mentioned microprocessor CPU. Numeral 113 designates a serial communication circuit connected between the above-mentioned microprocessor CPU and a monitoring control circuit 140a as described later.

Numeral 114 designates an input interface circuit connected between the above-mentioned switch sensor group 104 and a DIN port of the drive control circuit 110a. Numeral 115 designates a multi-channel AD converter connected between the above-mentioned analog sensor group 105 and an AIN port of the drive control circuit 110a. Numeral 116 designates an output interface circuit connected between the above-mentioned electrical load group 106 and an OUT port of the drive control circuit 110a.

Further, numeral 117 designates a driving switch element that is connected in series to the above-mentioned motor 107 and controls a power feed amount (that is, conduction current through the motor 107) with respect to the motor 107.

To act as the forgoing driving switch element, for example, NPN-type power transistor is employed, and this NPN-type power transistor performs a variable ON/OFF ratio operation to control a power feed amount with respect to the motor 107.

That is, a power feed amount with respect to the motor 107 is controlled by changing ratio between a conduction (ON) time period and a non-conduction (OFF) time period of the driving switch element 117.

Numeral 120 designates a current detection resistor connected to an emitter terminal of the above-mentioned transistor 117 (driving switch element). To this current detection resistor, current of the motor 107 flows from the battery 101 through the switch contact 103a of the power supply relay, the motor 107 and the transistor 117.

Numeral 121 designates a ballast resistor that is connected to a base terminal of the above-mentioned transistor 117 (driving switch element), and reduces a leak current at the time of interruption. Numeral 122 designates a transistor acting as an auxiliary switch element connected to a base circuit of the above-mentioned transistor 117 (driving switch element). Numeral 123 designates a conduction drive resistor connected between a conduction drive output DR2 of the above-mentioned drive control circuit 110a and a base terminal of the above-mentioned transistor 122. Numeral 124 designates a feed circuit resistor connected to a collector terminal of the above-mentioned transistor 122.

When the above-mentioned conduction drive output DR2 generates a drive output to come to logic level "H", the above-mentioned transistor 122 is brought into conduction; as well as voltage at the collector terminal of the transistor 122 is inputted to the above-mentioned drive control circuit 110a as a status signal ST1.

Furthermore, the above-mentioned status signal ST1 indicates an operation state of the above-mentioned transistor 117 (driving switch element) and an operation state of the transistor 146 (control circuit power supply interruption element). Further this status signal ST1 is arranged so that logic level thereof may be changed between "L" and "H", interlocking with an ON/OFF operation of the transistor 117 while the transistor 146 being continuously in conduction.

Numerals 125, 126 are voltage-dividing resistors connected to a collector terminal of the above-mentioned transistor 117 (driving switch element). A divided voltage provided by these voltage-dividing resistors is inputted to the above-mentioned drive control circuit 110a as a status signal ST2.

In addition, the above-mentioned status signal ST2 is arranged so that logic level thereof may be changed between "L" and "H", interlocking with an ON/OFF operation of the transistor 117 (driving switch element) in a state that the motor 107 is not disconnected.

Numeral 127 designates a feed-inhibit resistor connected between a feed-inhibit output SP1 of the above-mentioned drive control circuit 110a and a base terminal of a feed-inhibit transistor 148a, as described later. When the above-mentioned feed-inhibit output SP1 generates an inhibit output to come to logic level "H", the above-mentioned transistor 148a is brought into conduction.

Numeral 130a designates a comparison detection circuit that generates an error storage signal ERD and supplies it to the above-mentioned drive control circuit 110a. Numeral 131 designates an input resistor connected between a positive-side input terminal of the foregoing comparison detection circuit and the above-mentioned current detection resistor 120. Numerals 132, 133 designate voltage dividing resistors that divide an output voltage from a control power supply 141, as described later, and inputs the divided voltage to a negative-side terminal of the above-mentioned comparison detection circuit 130a.

Numeral 134 designates a positive feedback resistor connected between a positive-side input terminal and an output terminal of the above-mentioned comparison detection circuit 130a. Once a voltage across the above-mentioned current detection resistor 120 has become larger than a divided voltage provided by the above-mentioned voltage dividing resistors 132, 133, an output from the above-mentioned comparison detection circuit 130a continues to be at logic level "H" until the switch contact 103a is brought into an open circuit.

Numeral 135 designates a feed-inhibit resistor connected between an output terminal of the above-mentioned comparison detection circuit 130a and a base terminal of the feed-inhibit transistor 148a. Numeral 136 designates a conduction inhibit resistor connected between an output terminal of the above-mentioned comparison detection circuit 130a and a base terminal of a conduction-inhibit transistor 153, as described later. When error storage signal ERD, being an output from the above-mentioned comparison circuit 130a is at logic level "H", the feed-inhibit transistor 148a and conduction-inhibit transistor 153 are brought into conduction.

Numeral 140a designates a monitoring control circuit for monitoring operations of the above-mentioned drive control circuit 110a while performing a signal communication to each other with the drive control circuit 110a via the serial communication circuit 113. Numeral 141 designates a control power supply for generating a ballast voltage at DC 5V from voltage (DC 12V) that is fed from the battery 101 via the above-mentioned switch contact 103a. Numeral 142 designates a watchdog timer for monitoring operations of the microprocessor CPU forming the above-mentioned drive control circuit 110a. This watchdog timer is arranged so as to generate a reset output pulse RST 1 to start up the microprocessor CPU again when a pulse width of a watchdog signal WD1, which is a pulse train generated by the above-mentioned microprocessor CPU, exceeds a predetermined value.

Furthermore, the above-mentioned monitoring control circuit 140a is constituted as one integrated circuit element of a logic circuit having no microprocessor containing the above-mentioned watchdog timer 142 or a constant voltage control circuit section of the control power supply 141. However, it is also preferable that this integrated circuit element contains a microprocessor.

Numeral 143 designates a transistor connected to the above-mentioned electromagnetic coil 103. Numeral 144*a* designates a drive resistor connected between the above-mentioned power supply switch 102 and a base terminal of the transistor 143. Numeral 144*b* designates a drive resistor connected between a drive output DR0 of the above-mentioned monitoring control circuit 140*a* and a base terminal of the above-mentioned transistor 143. When the power supply switch 102 is brought into a closed circuit, the transistor 143 is driven from the battery 101, and then the electromagnetic coil 103 is energized.

In addition, a drive output DR0 of the above-mentioned monitoring control circuit 140*a* is brought into logic level "H" responsive to receiving a start signal ST that the drive control circuit 110*a* generates.

When the electromagnetic coil 103 is energized, and the switch contact 103*a* has once come to a closed circuit, the transistor 143 is brought into conduction to be driven in response to a power supply relay drive output DR0. Therefore operation of the electromagnetic coil 103 continues to be held until the drive output DR0 is stopped even if the power supply switch 102 comes to be an open circuit. During this time period, initialization of the monitoring control circuit 140*a* and drive control circuit 110*a* is performed.

Numeral 145 designates a feed drive resistor connected between a feed drive output DR1 of the above-mentioned monitoring control circuit 140*a* and a base terminal of a feed drive transistor 148, as described later. Numeral 146 designates a PNP-type transistor that connected to an input terminal or output terminal of the above-mentioned control power supply 141, and connected to a power supply line of DC 12V or DC 5V. This transistor 146 is connected in series with DC 12V (input voltage applied from the battery 101 to the control power supply 141), being a drive control power supply and a conduction controlling base drive circuit of the transistor 117 to act as a control circuit power supply interruption element.

Numeral 147 designates a collector resistor. Numeral 148 designates a feed drive transistor connected to a base terminal of the above-mentioned transistor 146 via the foregoing collector resistor 147. Numeral 149 designates a ballast resistor connected to a base terminal of the above-mentioned transistor 146. When the above-mentioned feed drive output DR1 generates a drive output to come to logic level "H", the feed drive transistor 148 is brought into conduction, and then the transistor 146 acting as a control circuit power supply interruption element comes to be in conduction.

Numeral 148*a* designates a feed-inhibit transistor connected to a base terminal of the above-mentioned feed drive transistor 148. When the above-mentioned feed-inhibit output SP1 or an error storage signal ERD comes to logic level "H", the feed-inhibit transistor 148*a* is brought into conduction to cause the feed drive transistor 148 to be in non-conduction.

When the feed drive transistor 148 becomes in non-conduction, the transistor 146 (control circuit power supply interruption element) comes to be in non-conduction, and a power supply circuit of the transistor 122, being a base drive circuit of the transistor 117 is interrupted.

Numeral 152 designates a conduction inhibit resistor connected between a conduction-inhibit output SP2 of the above-mentioned monitoring control circuit 140*a* and a base terminal of a conduction-inhibit transistor 153. Numeral 153 designates a conduction-inhibit transistor connected to a base terminal of the transistor 117 acting as the above-mentioned driving switch element. When the above-mentioned conduction-inhibit output SP2 generates an inhibit output to come to logic level "H", or when the above-mentioned error storage signal ERD comes to logic level "H", the conduction-inhibit transistor 153 comes to be in conduction.

When the conduction-inhibit transistor 153 becomes in conduction, the transistor 117 acting as a driving switch element comes to be in non-conduction thereby making it hard for a drive current of the motor 107 to flow.

Now, operations of the engine air-intake control device according to this first embodiment shown in FIG. 1 are described.

First, when the power supply switch 102 is brought into a closed circuit, the electromagnetic coil 103 of the power supply relay is energized resulting in a closed circuit of the switch contact 103*a*, and an electric power is fed to the control power supply 141 resulting in generation of a ballast constant voltage DC 5V.

The drive control circuit 110*a* or monitoring control circuit 140*a* is fed with an electric power from the control power supply 141 to start operation, and the drive control circuit 110*a* supplies a start signal ST with respect to the monitoring control circuit 140*a*.

Figure 2:
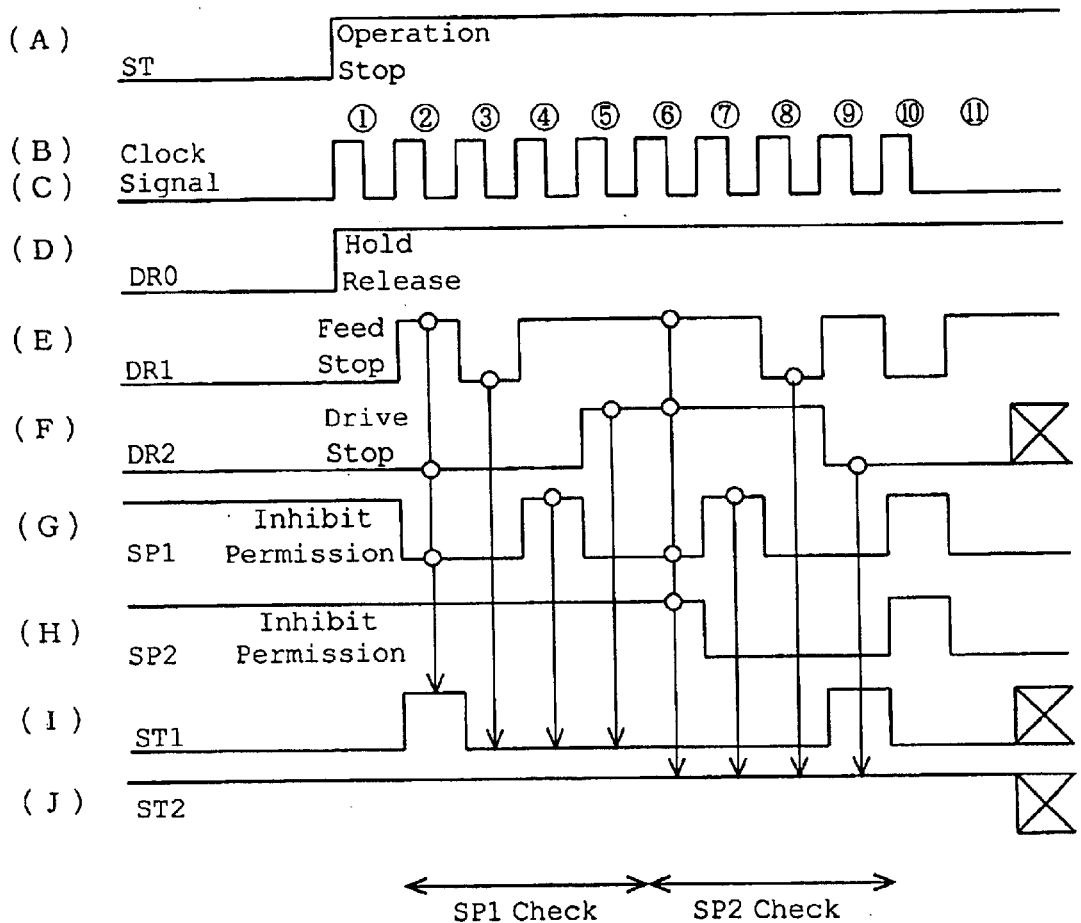
FIG. 2 is a time chart for explaining a startup sequence of the engine air-intake control device according to the first embodiment.

As a result, a drive output DR0 is generated, as well as a startup sequence, as described later with reference to FIG. 2, is carried out eventually coming to be in a normal operation state.

In the normal operation state, first the monitoring control circuit 140*a* generates a feed drive output DR1, and then the transistor 146 acting as a control circuit power supply interruption element comes to be in conduction.

Subsequently, the drive control circuit 110*a* shown in this first embodiment drives and controls the electrical load group 106 in accordance with an operation state of the switch sensor group 104 or the analog sensor group 105 and contents in the program memory 111*a*, and generates a conduction drive output DR2 in accordance with a detection output from the accelerator position sensor APS or the throttle position sensor TPS in the analog sensor group 105 and contents in the program memory 111*a*, thus performing an ON/OFF ratio control of the transistor 122 acting as an auxiliary switch element.

As a result, the transistor 117 is put under the ON/OFF ratio control, and the motor 107 operates so as to achieve that a throttle valve opening corresponding to a depression degree of the accelerator pedal.

On the contrary, the drive control circuit 110*a* implements a self-diagnosis such as whether or not there is any disconnection or short circuit fault at e.g., the accelerator position sensor APS and throttle position sensor TPS, or whether or not any data error occurs in the program memory 111*a*, or implements monitoring on the other side such as whether or not the serial communication with the monitoring control circuit 140*a* is conducted normally. At the time of detecting any abnormality, the drive control circuit 110*a* stops a conduction drive output DR2, as well as generates a feed-inhibit output SP1 to cause the transistor 146 acting as a control circuit power supply interruption element to come in an open circuit resulting in interruption of a power supply of a base circuit of the transistor 117 acting as a driving switch element of the motor 107.

That is, the current for driving the motor 107 is eliminated at the time of detecting any abnormality.

Likewise, the monitoring control circuit 140*a* monitors an operation state of the drive control circuit 110*a* while performing a data communication with the drive control circuit 110a via the serial communication circuit 113, or monitors runaway of the microprocessor contained in the drive control circuit 110a by means of the watchdog timer 142. At the time of detecting any abnormality, the monitoring control circuit 140a generates a conduction-inhibit output SP2 to bring the transistor 117 into non-conduction, as well as stops a feed drive output DR1 to bring the transistor 146 into an open circuit, resulting in interruption of a power supply of a base circuit of the transistor 117 acting as a driving switch element.

Furthermore, when a current flowing through the current detection resistor 120 becomes excessively large due to, e.g., a short circuit fault at the motor 107 or a connection wiring, the comparison detection circuit 130a operates to generate an error storage signal ERD, and brings the transistor 146 into an open circuit by the action of the feed-inhibit resistor 135 or the conduction inhibit resistor 136 to interrupt a power supply of the base circuit of the transistor 117 acting as a driving switch element, or causes the transistor 117 to bring into non-conduction by means of the conduction-inhibit transistor 153.

Thus, the drive control circuit 110a can stop the drive of the motor 107, which performs an open/close drive of an intake valve via the transistors 122 and 117 by stopping the conduction drive output DR2, as well as can interrupt a control power supply of the transistor 117 (driving switch element) via the transistors 148a, 148, 146 with a feed-inhibit output SP1.

Likewise, the monitoring control circuit 140a can interrupt a control power supply of the transistor 117 via the transistors 148, 146 by stopping a feed drive output DR1, as well as can stop the motor 107 via the transistors 153, 117 with a conduction-inhibit output SP2.

Meanwhile, upon the star-up of operation of the control device (specifically, engine air-intake control device 100a), the presence or absence of any error is discriminated by intentionally causing a feed drive output DR1, a feed-inhibit output SP1, a conduction drive output DR2 and a conduction-inhibit output SP2 to operate based on a startup sequence shown in FIG. 2 and monitoring status signals ST1 and ST2. Further an operation control starts after the absence of error has been confirmed.

FIG. 2 is a time chart for explaining a startup sequence of the control device (engine air-intake control device) 100a shown in FIG. 1.

With reference to FIG. 2, (A) indicates a start signal ST that the drive control circuit 110a generates. (B) indicates a clock signal in the drive control circuit 110a generating at the point of rising edge of the foregoing start signal ST. (C) indicates a clock signal generated in the monitoring control circuit 140a at the point of receiving the above-mentioned start signal ST. Although the forging clock signal (C) has a slight time delay with respect to the above-mentioned clock signal (B), the clock signal (C) is represented so as to operate at the same timing as the above-mentioned clock signal (B) as a matter of convenience.

(D) indicates a drive output DR0 of the power supply relay that the monitoring control circuit 140a generates. This drive output DR0 is at logic level "H" on and from the point of rising edge of the first pulse of the above-mentioned clock signal (C). (E) indicates a waveform of a feed drive output DR1 that the monitoring control circuit 140a generates. (F) indicates a waveform of a conduction drive output DR2 that the drive control circuit 110a generates. (G) indicates a waveform of a feed-inhibit output SP1 that the drive control circuit 110a generates. (H) indicates a waveform of a conduction-inhibit output SP2 that the monitoring control circuit 140a generates. These waveforms are arranged so as to change into logic level "H" or "L" at the point of the pulse rising edge of the clock signal (B) or (C).

(I) indicates a waveform of a status signal ST1 inputted to the drive control circuit 110a. (J) indicates a waveform of a status signal ST2 inputted to the drive control circuit 110a. These waveforms are arranged so as to change into logic level "H" or "L" at the point of pulse rising edge of the clock signal (B).

In addition, operation of the feed-inhibit output SP1 is confirmed during a time period from the second pulse to the fifth pulse of the clock waveform. During this time period, the status signal ST2 is "H" at all times by causing the conduction-inhibit output SP2 to be "H".

Furthermore, the case where the status signal ST1="H" in this state is limited to the cases where the feed drive output DR1="H", the feed-inhibit output SP1="L", and the conduction drive output DR2="L". The status signal ST1="L" in the case where the feed drive output DR1="L", the feed-inhibit output SP1="H", or the conduction drive output DR2="H".

Operation of the conduction-inhibit output SP2 is confirmed during a time period from the sixth pulse to the ninth pulse of the clock waveform. During this time period, even if the feed drive output DR1="H", the feed-inhibit output SP1="L" and the conduction drive output DR2="H" to satisfy all the conditions, the status signal ST2="H" if the conduction-inhibit output SP2="H". Then the transistor 117 is confirmed to be in non-conduction.

Moreover, even if the conduction-inhibit output SP2="L", the status signal ST2="H" so long as the feed-inhibit output SP1="H", the feed drive output DR1="L", or the conduction drive output DR2="L". Then the transistor 117 is confirmed to be in non-conduction.

The tenth pulse of the clock waveform is in a standby state in which the feed drive output DR1="L", the feed-inhibit output SP1="H", the conduction drive output DR2="L", and the conduction-inhibit output SP2="H" thereby completing a startup sequence.

Figure 3:
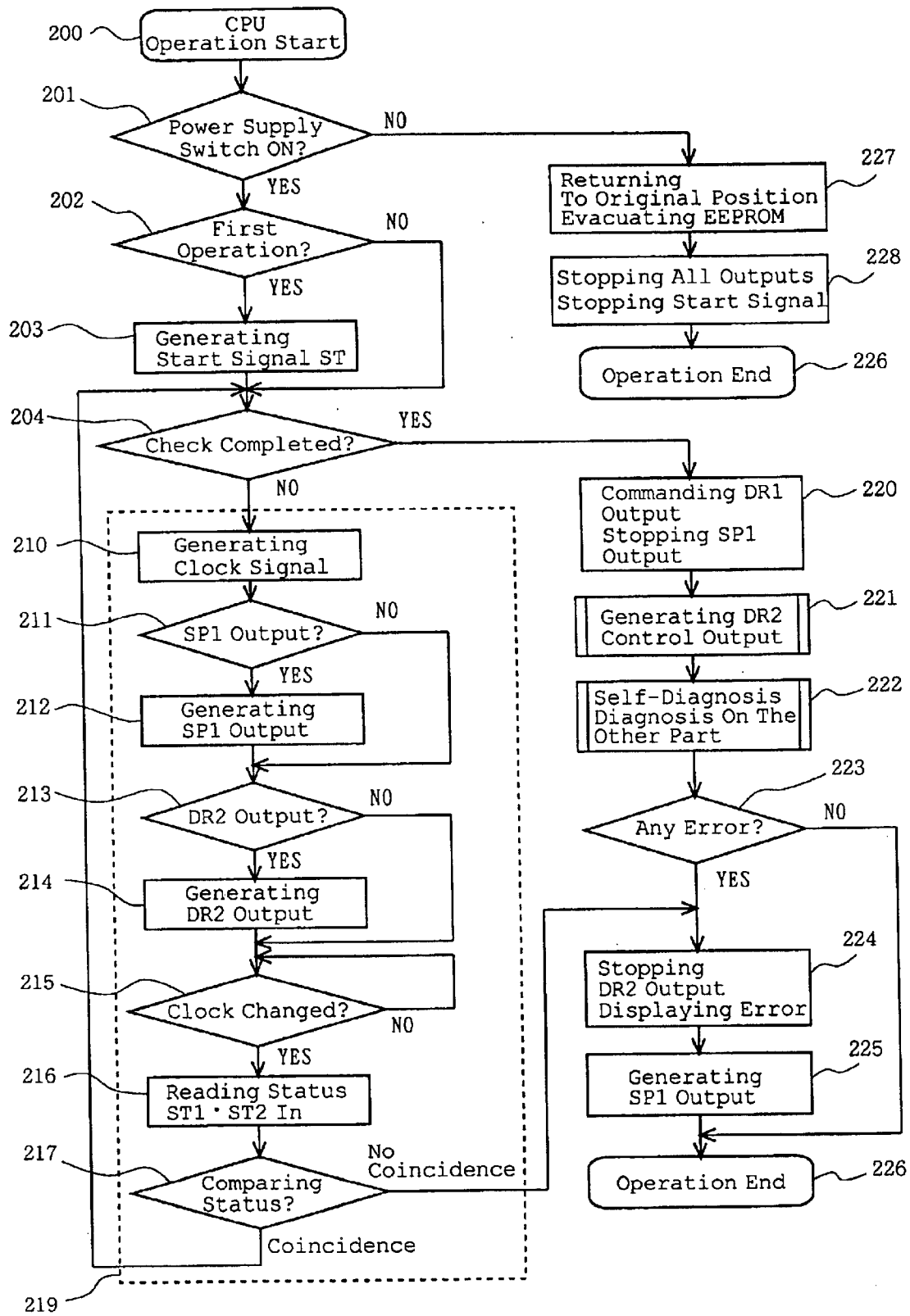
FIG. 3 is a flowchart for explaining a drive control operation of the engine air-intake control device according to the first embodiment.

FIG. 3 is a flowchart for explaining a drive control operation of the control device (engine air-intake control device) 100a shown in FIG. 1.

With reference to FIG. 3, numeral 200 is an operation start step of the microprocessor CPU in the drive control circuit 110a. Numeral 201 is a step that operates subsequently to step 200, and determines whether or not the power supply switch 102 is ON. Numeral 202 is a step that operates when step 201 determines YES, and discriminates whether or not it is the first operation depending on whether or not the start signal ST has been generated in the following step 203. Numeral 203 is a step that operates when step 202 determines the first operation, and generates the start signal ST. Numeral 204 is a step that operates when the above-mentioned step 202 determines that it is not the first operation, or subsequently to the above-mentioned step 203 or step 217 as described later, and discriminates whether or not the clock signal (B) has proceeded until completion of a startup sequence. In this step 204, it is determined whether or not a clock counter, not shown, has exceeded a count value of 10.

Numeral 210 is a step that operates when the above-mentioned step 204 determines non-completion of the startup sequence, and generates a clock signal by one pulse. Numeral 211 is a step that operates subsequently to step 210, and discriminates whether or not it is timing of generating a feed-inhibit output SP1 based on a time chart of FIG. 2. Numeral 212 is a step that operates when step 211 determines YES, and generates a feed-inhibit output SP1. Numeral 213 is a step that operates when the above-mentioned step 211 determines NO, or subsequently to step 212, and discriminates whether or not it is timing of generating a conduction drive output DR2 based on the time chart of FIG. 2. Numeral 214 is a step that operates when step 213 discriminates YES, and generates a conduction drive output DR2. Numeral 215 is a determination standby step that operates when the above-mentioned step 213 discriminates NO, or subsequently to step 214, and performs an operation standby until logic level of a current clock signal changes from "H" to "L".

Numeral 216 is a step that operates when step 215 determines the presence of change in clock signal, and reads in the status signals ST1 and ST2. Numeral 217 is a step that operates subsequently to step 216, and compares a logic level of a normal status signal having been preliminarily stored with a logic level having been read in by step 216. The program proceeds to the above-mentioned step 204 when this step 217 determines coincidence.

Numeral 219 is a step block formed of the above-mentioned steps 210 to 217, and represents steps of operation start permission (that is, steps of operation start permission means in the drive control circuit 110a).

Numeral 220 is a step that operates subsequently to the above-mentioned step 204 when all the operations of the above-mentioned step block 219 functioning as the operation start permission have normally completed, and transmits a power feed drive command in order to generate a feed drive output DR1 with respect to the monitoring control circuit 140a via the serial communication circuit 113 as well as stops the feed-inhibit output SP1 (at logic level "L") to bring a state capable of feeding an electric power. Numeral 221 is an automatic control step that operates subsequently to step 220, and generates a ratio control output of the conduction drive output DR2 responsive to a detection output from the accelerator position sensor APS or throttle position sensor TPS in the analog sensor group 105. Numeral 222 is a step that operates subsequently to step 221, and detects presence or absence of any error by a method of self-diagnosis using the drive control circuit 110a or diagnosis on the other part with respect to the monitoring control circuit 140a.

Numeral 223 is a step that operates subsequently to the above-mentioned step 222, and discriminates whether or not any error has been detected by step 222. Numeral 224 is a step that operates when the above-mentioned step 217 determines no coincidence (that is, when comparing a logic level of a normal status signal having been preliminarily stored with a logic level having been read in by step 216 to determine no coincidence), or when the above-mentioned step 223 determines the presence of any error, and stops the drive control output DR2 to interrupt the transistor 117 as well as generates an error alarm display output with respect to the alarm display in the electrical load group 106. Numeral 225 is a step that operates subsequently to step 224, and generates the feed-inhibit output SP1 to interrupt the transistor 146 acting as a control circuit power supply interruption element and to interrupt a control power supply circuit of the transistor 117 acting as a driving switch element. Numeral 226 is a standby step that operates when the above-mentioned step 223 determines absence of any error, or subsequently to the above-mentioned step 225, and ends a periodical control operation. Then the microprocessor CPU constituting the drive control circuit 110a implements other control operations, and thereafter activates the operation start step 200 again.

Numeral 227 is a step that operates when the above-mentioned step 201 determines that the power supply switch is OFF, and causes, e.g., an exhaust gas recirculation driving stepping motor to return to its origin position, or stores and evacuates various learning information, error history information or the like, which are stored in the operation memory 112 with respect to a nonvolatile memory such as EEPROM memory, not shown, provided in the drive control circuit 110a. Numeral 228 is a step for stopping the start signal ST or all outputs, which the drive control circuit 110a generates. Then the program proceeds to an operation end step 226 subsequent to this step 228.

Further, due to the fact that the start signal ST has been stopped in the above-mentioned step 228, the drive output DR0 of the power supply relay is stopped at the monitoring control circuit 140a, and the electromagnetic coil 103 is de-energized resulting in interruption of a power supply provision with respect to the control device 100.

Figure 4:
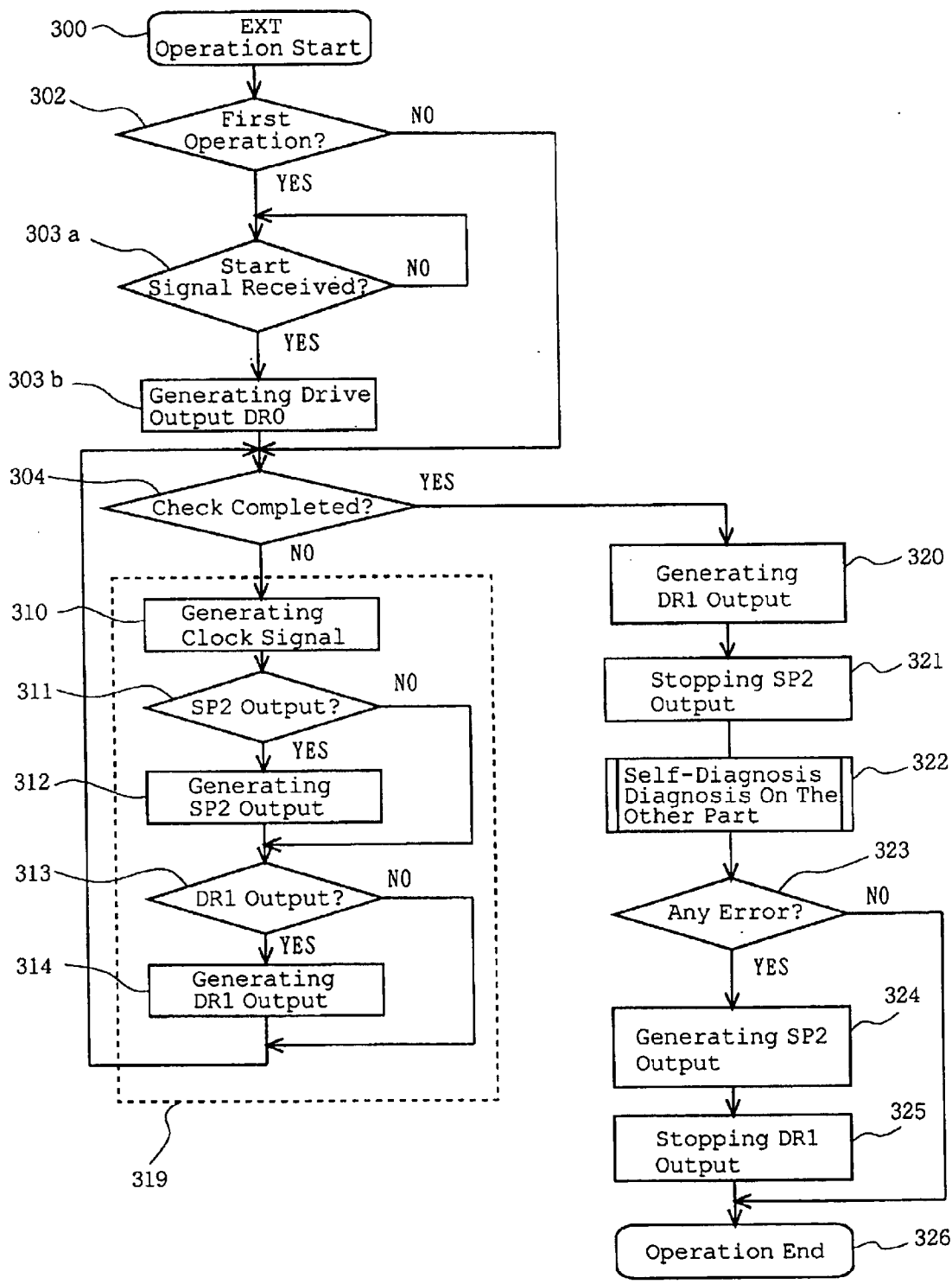
FIG. 4 is a flowchart for explaining a monitoring control operation of the engine air-intake control device according to the first embodiment.

FIG. 4 is a flowchart for explaining a monitoring control operation at the monitoring control circuit 140a of the control device (engine air-intake control device) shown in FIG. 1.

With reference to FIG. 4, numeral 300 is an operation start step of the monitoring control circuit 140a. Numeral 320 is a step that operates subsequently to step 300, and discriminates whether or not it is the first operation depending on whether or not the drive output DR0 has been generated in step 303b as described later. Numeral 303a is a determination step that operates when step 302 determines the first operation, and stands by until receiving a start signal ST. Numeral 303b is a step that operates when the above-mentioned step 303a determines the receiving completion, and generates the drive output DR0 of the power supply relay. Numeral 304 is a step that operates when the above-mentioned step 302 determines that it is not the first operation, or subsequently to the above-mentioned step 303b or step 314 as described later, and discriminates whether or not the clock waveform (C) of FIG. 2 has proceeded until the completion of a startup sequence. This step 304 determines whether or not a clock counter, not shown, exceeds a count value of 10.

Numeral 310 is a step that operates when the above-mentioned step 304 determines non-completion, and generates a clock signal by one pulse. Numeral 311 is a step that operates subsequently to step 310, and discriminates whether or not it is timing of generating a conduction-inhibit output SP2 based on the time chart of FIG. 2. Numeral 312 is a step that operates when step 311 discriminates YES, and generates a conduction-inhibit output SP2. Numeral 313 is a step that operates when the above-mentioned step 311 discriminates NO, or subsequently to step 312, and discriminates whether or not it is timing of generating a feed drive output DR1 based on the time chart of FIG. 2. Numeral 314 is a step that operates when step 313 discriminates YES, and generates a feed drive output DR1. Then, when the above-mentioned step 313 discriminates NO, or subsequently to the above-mentioned step 314, the program proceeds to the above-mentioned step 304.

Furthermore, the feed drive output DR1, which is generated by the above-mentioned step 314, is different from the feed drive output by a step 320 as described later, and is the one that the monitoring control circuit 140a solely generates without depending on the serial communication circuit 113.

Numeral 319 is a step block formed of the above-mentioned steps 310 to 314. This step block represents steps of operation start permission (specifically, steps of operation permission means in the monitoring control circuit 140a).

Numeral 320 is a step that operates subsequently to the above-mentioned step 304 when all the operations of step block 319 acting as the above-mentioned operation start permission means have completed, and generates a feed drive output DR1 based on a power feed drive command having been transmitted via the serial communication circuit 113 by step 220 of FIG. 3. Numeral 321 is a step that operates subsequently to step 320, and stops the conduction-inhibit command SP2 to bring the transistor 117 in a state capable of conduction. Numeral 322 is a step that operates subsequently to step 321, and detects presence or absence of any error by a method of a self-diagnosis performed by the monitoring control circuit 140a or diagnosis on the other part with respect to the drive control circuit 110a.

Numeral 323 is a step that operates subsequently to the above-mentioned step 322, and discriminates whether or not any error has been detected by step 322. Numeral 324 is a step that operates when the above-mentioned step 323 discriminates the presence of any error, and generates the conduction-inhibit output SP2 to interrupt the transistor 117. Numeral 325 is a step that operates subsequently to step 324, and stops the feed conduction output DR1 to interrupt the transistor 146 acting as a control circuit power supply interruption element and to interrupt a control power supply circuit of the transistor 117 acting as a driving switch element. Numeral 326 is a standby step that operates when the above-mentioned step 323 discriminates the absence of error, or subsequently to the above-mentioned step 325, and ends a periodical control operation. A logic circuit constituting the monitoring control circuit 140a performs other control operations, and thereafter activates the operation start step 300 again.

In addition, it is preferable that there is provided a comparison detection circuit that generates an over-current detection output, and stores operation of this over-current detection output to make at least one of the conduction drive output or the feed drive output, reactive.

Thus, in the case of the occurrence of, e.g., any short circuit fault of a motor circuit, a driving switch element or power supply interruption element is immediately interrupted, thereby enabling to prevent the driving switch element or power supply element from being burnt out.
Embodiment 2.

Figure 5:
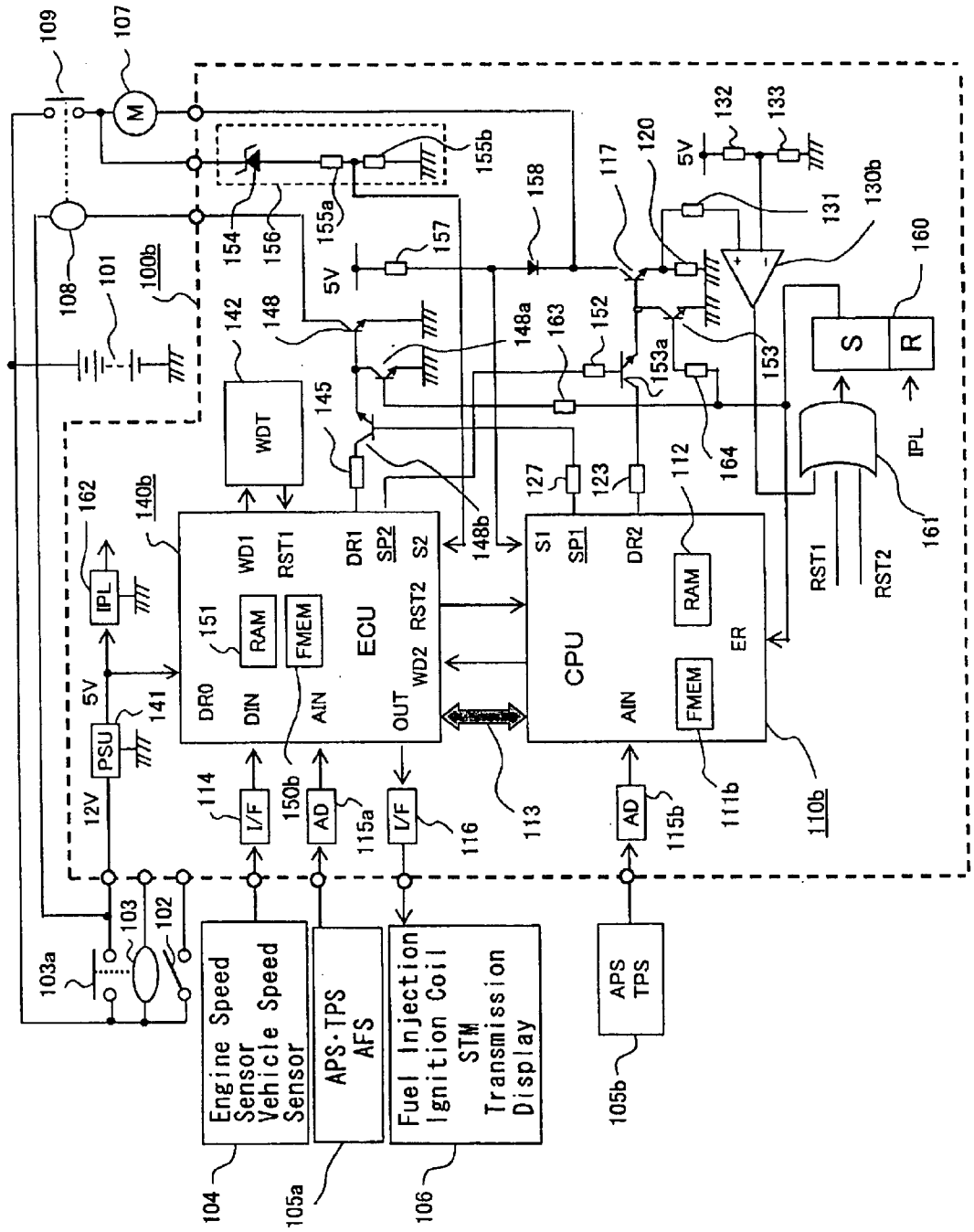
FIG. 5 is a block diagram showing constitution of an engine air-intake control device according to a second preferred embodiment.

FIG. 5 is a block diagram showing constitution of an engine air-intake control device according to a second preferred embodiment of this invention.

With reference to FIG. 5, 100b designates an engine air-intake control device (merely, abbreviated as "control device" as well) containing fuel injection control means and the like with respect to an on-vehicle engine. First external input/output apparatus connected thereto via a connector, not shown, are described.

Numeral 101 designates an on-vehicle battery, for example, of 12V the negative-side terminal of which is connected to a vehicle body. Numeral 103a designates a switch contact the opening and closing of which is driven by means of the electromagnetic coil 103 energized via the power supply switch 102, and which provides connection between the above-mentioned battery 101 and the control device 100b. Further the electromagnetic coil 103 and switch contact 103a form a power supply relay for opening and closing a main power supply circuit of the above-mentioned control device 100b.

In addition, details of an energizing circuit of the above-mentioned electromagnetic coil 103 are described with reference to FIG. 9 (block diagram showing constitution of an engine air-intake control device according to a third preferred embodiment described later).

Numeral 104 designates a switch sensor group such as engine speed sensor, crank angle sensor, and vehicle speed sensor. Numeral 105a designates an analog sensor group such as airflow sensor AFS for measuring an air-intake of a throttle, accelerator position sensor APS for measuring a depression degree of an accelerator pedal, and throttle position sensor TPS for measuring a throttle valve opening. Numeral 105b designates an analog sensor group located in a duplicate system such as a throttle position sensor TPS for measuring a throttle valve opening and an accelerator position sensor APS for measuring a depression degree of an accelerator pedal. Numeral 106 designates an electrical load group such as ignition coil of an engine, fuel injection electromagnetic valve, stepping motor for driving an exhaust gas recirculation valve, gear level switching electromagnetic valve of a transmission, and various alarm displays. Numeral 107 designates a motor for driving the opening and closing of an intake valve.

Further, numeral 108 designates an electromagnetic coil connected between the above-mentioned switch contact 103a and the control device (i.e., engine air-intake control device) 100b. Numeral 109 designates a switch contact coming to a closed circuit when this electromagnetic coil 108 is energized. The electromagnetic coil 108 and switch contact 109 form a load relay opening and closing a load circuit (specifically, a circuit for supplying a driving power supply to the motor 107).

That is, the foregoing load relay is connected between the above-mentioned motor 107 and battery 101 to act as a load circuit power supply interruption element.

Next, an internal constitution of the control device (engine air-intake control device) 100b is described. Numeral 110b designates a drive control circuit constituted so that a microprocessor CPU may be a principal component. Numeral 111b designates a program memory, for example, a flash memory cooperating with the above-mentioned microprocessor CPU. Numeral 112 designates an operation memory, specifically, a RAM memory cooperating with the above-mentioned microprocessor CPU. Numeral 113 designates a serial communication circuit connected between the above-mentioned microprocessor CPU and a monitoring control circuit 140b as described later.

Numeral 115b designates a multi-channel AD converter connected between the above-mentioned analog sensor group 105b and an AIN port of the drive control circuit 110b. Numeral 117 designates a transistor acting as a driving switch element that is connected in series to the above-mentioned motor 107, and performs a variable ON/OFF ratio operation to control a power feed amount with respect to the motor 107. As this driving switch element, e.g., an NPN-type power transistor is employed.

Numeral 120 designates a current detection resistor connected to an emitter terminal of the above-mentioned transistor 117 (driving switch element). To this current detection resistor, current of the motor 107 flows from the battery 101 through the switch contact 109 of the load relay, the motor 107 and the transistor 117.

Numeral 123 designates a conduction drive resistor that is connected in series to a transistor 153a as described later, and connected between a conduction drive output DR2 of the above-mentioned drive control circuit 110b and a base terminal of the above-mentioned transistor 117 via this transistor 153a. When the above-mentioned conduction-drive output DR2 generates a drive output to come to logic level "H", the above-mentioned transistor 117 is brought into conduction in the case where the transistor 153a is in conduction.

Numeral 127 designates a feed-inhibit resistor connected between a feed-inhibit output SP1 of the above-mentioned drive control circuit 110b (SP1 is a NOT logic output of SP1, and hereinafter the same representation is used) and a base terminal of a transistor 148b as described later. When the above-mentioned feed-inhibit output SP1 generates an inhibit output to come to logic level "L", a transistor 148 as described later is brought into non-conduction.

Numeral 130b designates a comparison detection circuit. Numeral 131 designates an input resistor connected between a positive-side input terminal of this comparison detection circuit 130b and the above-mentioned current detection resistor 120. Numerals 132, 133 designate voltage-dividing resistors that divide an output voltage from a control power supply 141 as described later, and input the divided voltage to a negative-side terminal of above-mentioned comparison detection circuit 130b. When voltage across the above-mentioned current detection resistor 120 exceeds a divided voltage provided by the above-mentioned voltage dividing resistors 132, 133, an error storage circuit 160 is set via an OR element 161 as described later, and an error storage signal ER is supplied to the drive control device 110b.

Numeral 140b designates a monitoring control circuit for monitoring operations of the above-mentioned drive control circuit 110b while performing a signal communication with the drive control circuit 110b each other via the serial communication circuit 113, as well as includes functions to control a fuel injection and to control ignition with respect to the engine.

Numeral 114 designates an input interface circuit connected between the above-mentioned switch sensor group 104 and a DIN port of the monitoring control circuit 140b. Numeral 115a designates a multi-channel AD converter between the above-mentioned analog sensor group 105a and an AIN port of the monitoring control circuit 140b. Numeral 116 designates an output interface circuit connected between the above-mentioned electrical load group 106 and an OUT port of the monitoring control circuit 140b.

Numeral 141 designates a control power supply that is fed with an electric power from the battery 101 via the above-mentioned switch contact 103a, and generates a ballast voltage at DC 5V. Numeral 142 designates a watchdog timer for monitoring operations of a microprocessor ECU forming the above-mentioned monitoring control circuit 140b. This watchdog timer is arranged to generate a reset output pulse RST 1 to start up the above-mentioned microprocessor ECU again when a pulse width of a watchdog signal WD1, specifically, a pulse train which the microprocessor ECU generates exceeds a predetermined value.

Numeral 145 designates a feed drive resistor that is connected in series to a transistor 148b as described later, and connected to a feed drive output DR1 of the above-mentioned monitoring control circuit 140b. Numeral 148 designates a feed drive transistor the collector terminal of which is connected to the above-mentioned electromagnetic coil 108. When the above-mentioned feed drive output DR1 generates a drive output to come to logic level "H", the transistor 148 comes to be in conduction in the case where the transistor 148b is in conduction. As a result, the electromagnetic coil 108 is energized causing the motor 107 and the battery 101 to be connected via the switch contact 109.

Numeral 148a designates a feed-inhibit transistor connected to a base terminal of the above-mentioned feed drive transistor 148. When an error storage signal ER comes to logic level "H", the feed-inhibit transistor 148a is brought into conduction causing the feed drive transistor 148 to be in non-conduction.

Numeral 148b is a transistor that comes to non-conduction to bring the feed drive transistor 148 into non-conduction when a drive inhibit output SP1 is at logic level "L" as described above.

Numeral 150b designates a program memory, for example, a flash memory that cooperates with the microprocessor ECU constituting the above-mentioned monitoring control circuit 140b. Numeral 151 designates an operation memory, specifically, a RAM memory that cooperates with the above-mentioned microprocessor ECU. Numeral 152 designates a conduction inhabit resistor connected between a conduction-inhibit output SP2 of the above-mentioned monitoring control circuit 140b and a base terminal of a transistor 153a as described later. Numeral 153 designates a conduction-inhibit transistor connected to a base terminal of the transistor 117 acting as the above-mentioned driving contact element. Numeral 153a designates a conduction-inhibit transistor connected between the above-mentioned conduction drive resistor 123 and a base terminal of the transistor 117. When the above-mentioned conduction-inhibit output SP2 generates an inhibit output to come to logic level "L" or when the above-mentioned error storage signal ER comes to logic level "H", the transistor 117 acting as a driving switch element is brought into non-conduction.

Numeral 154 designates a constant voltage diode having a voltage DR0p slightly larger than an output voltage of the above-mentioned control power supply 141. Numerals 155a and 155b designate voltage-dividing resistors. Numeral 156 designates a closed circuit detection circuit where the above-mentioned constant voltage diode 154 and the voltage dividing resistors 155a, 155b are connected in series. This closed circuit detection circuit 156 is connected to the battery 101 via the above-mentioned switch contact 109. A divided voltage provided by the voltage dividing resistors 155a, 155b is supplied to the above-mentioned monitoring control circuit 140b as a status signal S2.

The above-mentioned constant voltage diode 154 is provided in order to prevent current from wraparound when the switch contact 109 of the load relay is in an open circuit state. By the action of this constant voltage diode 154, application of an error detection voltage from the constant power supply 141 (5V)→a resistor element 157→a diode 158→the motor 107→the constant voltage diode 154→the voltage dividing resistor 155a→to a status signal input terminal S2 is prevented.

Numeral 157 designates a resistor element connected to an output terminal of the above-mentioned control power supply 141. Numeral 158 designates a diode connected between this resistor element 157 and a collector terminal of the above-mentioned transistor 117. Thus a dummy load circuit is formed, in which a minute current flows from the control power supply 141 through the resistor element 157 and the diode 158 when the transistor 117 is energized.

Additionally, a connection point between the above-mentioned resistor element 157 and diode 158 is connected to the above-mentioned drive control circuit 110b as a status signal S1.

Further, runaway of the above-mentioned monitoring control circuit 140b is monitored by means of the watchdog timer 142, as well as the monitoring control circuit 140b performs runaway monitoring with respect to the drive control device 110b. When a pulse width of a watchdog signal WD2, being a pulse train generated by the microprocessor CPU constituting the drive control circuit 110b exceeds a predetermined value, the microprocessor ECU constituting the monitoring control circuit 140b generates a reset output pulse RST2 to start up the above-mentioned microprocessor CPU again.

Numeral 160 designates an error storage circuit set via an OR element 161. Numeral 161 designates an OR element to which an output from the above-mentioned comparison detection circuit 130b, a reset output pulse RST1 generated by the above-mentioned watchdog timer 142, and a reset output pulse RST2 generated by the above-mentioned monitoring control circuit 140b are input. Numeral 162 designates a power supply pulse generation circuit that generates a pulse output IPL when the power supply switch 102 is turned on. The above-mentioned error storage circuit 160 is reset in response to the foregoing pulse output IPL.

Numeral 163 designates a feed-inhibit resistor connected between a set output terminal of the above-mentioned error storage circuit 160 and a base terminal of the feed-inhibit transistor 148a. Numeral 164 designates a conduction inhibit resistor connected between a set output terminal of the above-mentioned error storage circuit 160 and a base terminal of a conduction-inhibit transistor 153 as described later. When an error storage signal ER, being a set output from the above-mentioned error storage circuit 160, is at logic level "H", the feed-inhibit transistor 148a and the conduction-inhibit transistor 153 are brought into conduction.

Now, operations of the engine air-intake control device according to this second embodiment shown in FIG. 5 are described.

First, when the power supply switch 102 is brought into a closed circuit, the electromagnetic coil 103 of the power supply relay is energized resulting in a closed circuit of the switch contact 103a, and an electric power is fed to the control power supply 141 resulting in generation of a ballast constant voltage DC 5V.

Figure 6:
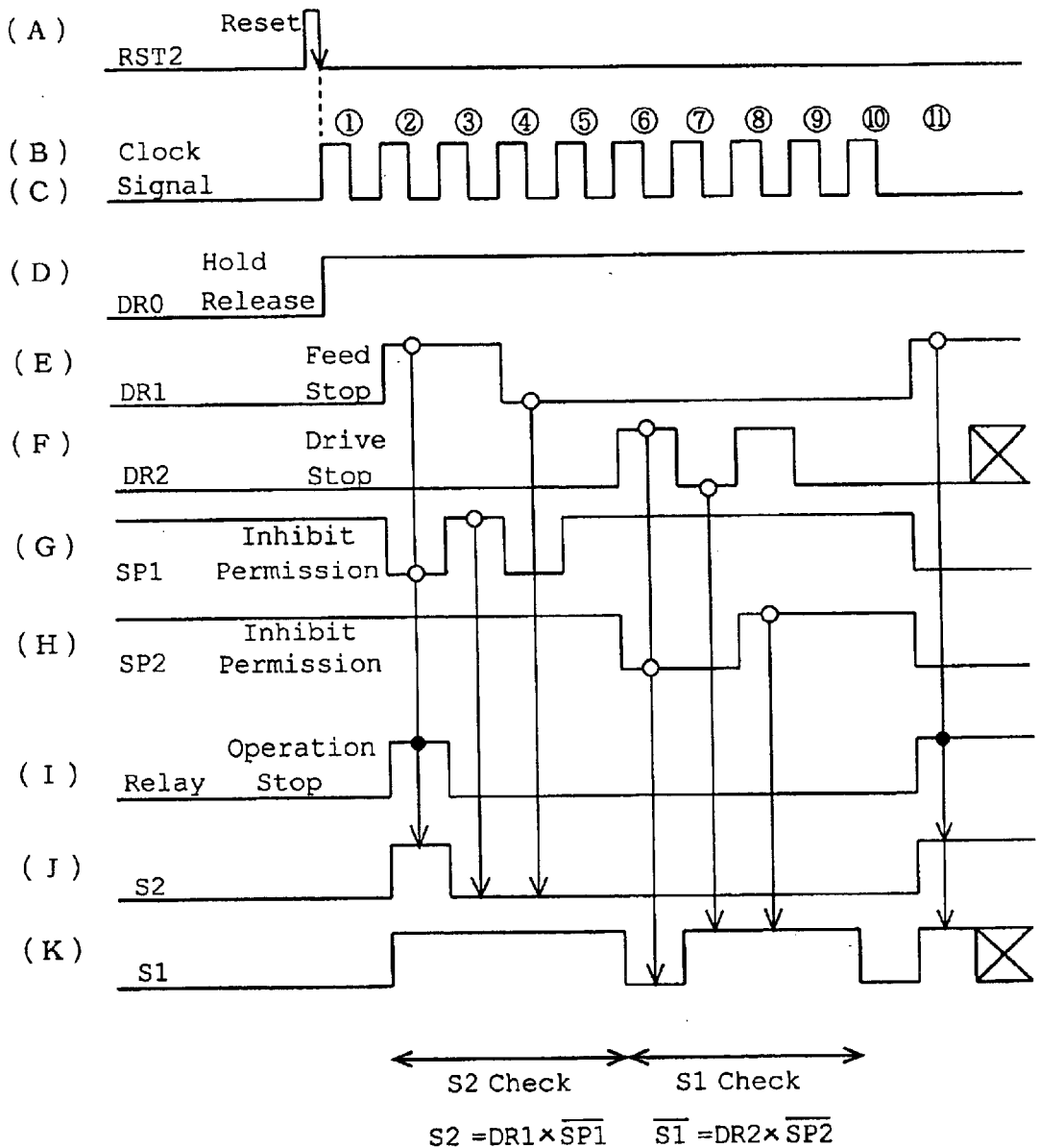
FIG. 6 is a time chart for explaining a startup sequence of the engine air-intake control device according to the second embodiment.

The drive control circuit 110b or monitoring control circuit 140b is fed with an electric power from the control power supply 141 to start the operation, and the monitoring control circuit 140b supplies a reset output pulse RST2 with respect to the drive control circuit 110b. In addition, a drive output DR0 is generated, and a startup sequence as described later with reference to FIG. 6 is carried out eventually coming to be in a normal operation state.

In the normal operation state, first the monitoring control circuit 140b generates a feed drive output DR1, and the electromagnetic coil 108 is energized via the feed drive transistors 148b and 148.

Subsequently, the monitoring control circuit 140b shown in this second embodiment drives and controls the electrical load group 106 in accordance with an operation state of the switch sensor group 104 or the analog sensor group 105a and contents in the program memory 150b. The drive control circuit 110b generates a conduction drive output DR2 in accordance with a detection output from the accelerator position sensor APS or the throttle position sensor TPS in the analog sensor group 150b and contents in the program memory 111b, and performs an ON/OFF ratio control of the transistor 117.

As a result, the motor 107 operates so that a throttle valve opening may correspond to a depression degree of the accelerator pedal.

On the other hand, the drive control circuit 110b implements a self-diagnosis such as whether or not there is any disconnection and short circuit fault, e.g., at the accelerator position sensor APS and the throttle position sensor TPS, or whether or not any error is present in data of the program memory 111b, or implements monitoring on the other side such as whether or not a serial communication with the monitoring control circuit 140b is conducted normally. At the time of detecting any abnormality, the drive control circuit 110b stops the conduction drive output DR2, as well as makes a feed-inhibit output SP1 to come to logic level "L" to bring the transistor 148b and the feed drive transistor 148 into non-conduction. Further the drive control circuit 110b de-energizes the electromagnetic coil 108, and brings the switch contact 109 into an open circuit to interrupt a power supply circuit of the motor 107.

Likewise, the monitoring control circuit 140b monitors an operation state of the drive control circuit 110b while performing a data communication with the drive control circuit 110b via the serial communication circuit 113. At the time of detecting any abnormality, the monitoring control circuit 140b makes a conduction-inhibit output SP2 come to logic level "L" to bring the transistors 153a and 117 into non-conduction. In addition, the monitoring control circuit 140b stops a feed drive output DR1 to interrupt a power supply circuit of the motor 107 via the transistor 148, electromagnetic coil 108, and switch contact 109.

Further, when current flowing through the current detection resistor 120 becomes excessively large due to, e.g., a short circuit fault at the motor 107 and a connection wiring, the comparison detect-ion circuit 130b operates to set the error storage circuit 160. This error storage circuit 160 generates an error storage signal ER, being a storage output thereof to interrupt a power supply circuit of the motor 107, or to bring the transistor 117 into non-conduction by the action of the feed-inhibit resistor 163 or the conduction inhibit resistor 164.

Furthermore, when the microprocessor CPU in the drive control circuit 110b runs away, it is activated again responsive to a reset output pulse RST2 of the monitoring control circuit 140b. When the microprocessor ECU in the monitoring control circuit 140b runs away, it is activated again responsive to a reset output pulse RST1 of the watchdog timer 142. However, the occurrence of these reset output pulses is stored by means of the error storage circuit 160, so that the electromagnetic coil 108 continues to be de-energized, and the transistor 117 remains in a state of non-conduction as well.

In this state, an evacuation operation is performed by means of the monitoring control circuit 140b without depending on the control of opening and closing a throttle valve by means of the motor 107.

Thus, the drive control circuit 110b can stop the motor 107 via the transistor 117 by stopping the conduction drive output DR2, as well as can interrupt a power supply circuit of the motor 107 via the transistors 148b and 148, electromagnetic coil 108 and switch contact 109 with the feed-inhibit output SP1.

Likewise, the monitoring control circuit 140b can interrupt a power supply circuit of the motor 107 via the transistor 148, electromagnetic coil 108 and switch contact 109 by stopping a feed drive output DR1, as well as can stop the motor 107 via the transistors 153a and 117 with the conduction-inhibit output SP2.

Meanwhile, upon the star-up of operation of the control device, presence or absence of any error is discriminated by intentionally causing a feed drive output DR1, a feed-inhibit output SP1, a conduction drive output DR2 and a conduction-inhibit output SP2 to operate based on a startup sequence shown in FIG. 6 and monitoring status signals S1 and S2. Further an operation control is to start after the absence of error has been confirmed.

FIG. 6 is a time chart for explaining a startup sequence of the control device (engine air-intake control device) 100b shown in FIG. 5.

With reference to FIG. 6, (A) is a reset output pulse RST2 that the monitoring control circuit 140b generates. (B) is a clock signal in the monitoring control circuit 140b generated at the point when the foregoing reset output pulse RST2 has changed from logic level "H" to "L". (C) is a clock signal generated in the drive control circuit 110b at the point of receiving the above-mentioned reset output pulse RST2 to detect the change in logic level "H"→"L". Although the forging clock signal (C) has a slight time delay with respect to the above-mentioned clock signal (B), it is represented so as to operate at the same timing as the above-mentioned clock signal (B) as a matter of convenience.

(D) shows a drive output DR0 of the power supply relay that the monitoring control circuit 140b generates. This drive output DR0 is being at logic level "H" on and from the point of rising edge of the first pulse of the above-mentioned clock signal (B).

(E) is a waveform of a feed drive output DR1 that the monitoring control circuit 140b generates. (F) is a waveform of a conduction drive output DR2 that the drive control circuit 110b generates. (G) is a positive logic waveform of a feed-inhibit output SP1 that the drive control circuit 110b generates. (H) is a positive logic waveform of a conduction-inhibit output SP2 that the monitoring control circuit 140b generates. These waveforms are arranged so as to change to logic level "H" or "L" at the point of pulse rising edge of the clock signal (B) or (C).

(I) is a drive waveform of the electromagnetic coil 108, being a load relay. (J) is a waveform of a status signal S2 inputted to the monitoring control circuit 140b. (K) is a waveform of a status signal S1 inputted to the drive control circuit 110b. These waveforms are changed to logic level "H" or "L" at the point of pulse rising edge of the clock signal (B) or (C).

Besides, operation of the feed-inhibit output SP1 is confirmed during a time period from the second pulse to the fifth pulse of the clock waveform. During this time period, the status signal S1 is "H" continuously by making a conduction-inhibit output SP2="L" (SP2="H").

Furthermore, the case where the status signal S2="H" in this state is limited to the case where the feed drive output DR1="H", as well as the feed-inhibit output SP1="H" (SP1="H"). The status signal S2="L" in the case where the feed drive output DR1="L", or the feed-inhibit output SP1="L".

The operation of the conduction-inhibit output SP2 is confirmed during a time period from the sixth pulse to the ninth pulse of the clock waveform. During this time period, the status signal S2="L" continuously by making the feed-inhibit output SP1="L" (SP1="H").

Moreover, the case where the status signal S1="L" in this state is limited to the case where the conduction drive output DR2="H", as well as the conduction-inhibit output SP2="H" (SP2="L"). the status signal S1="H" in the case where the conduction drive output DR2="L", or the conduction-inhibit output SP2="L" (SP2="H").

The tenth pulse of the clock waveform is to be in a standby state in which the power feed drive output DR1="L", the feed-inhibit output SP1="L" (SP1="H"), the conduction drive output DR2="L", and the conduction-inhibit output SP2="L" (SP2="H") thereby completing the startup sequence.

Figure 7:
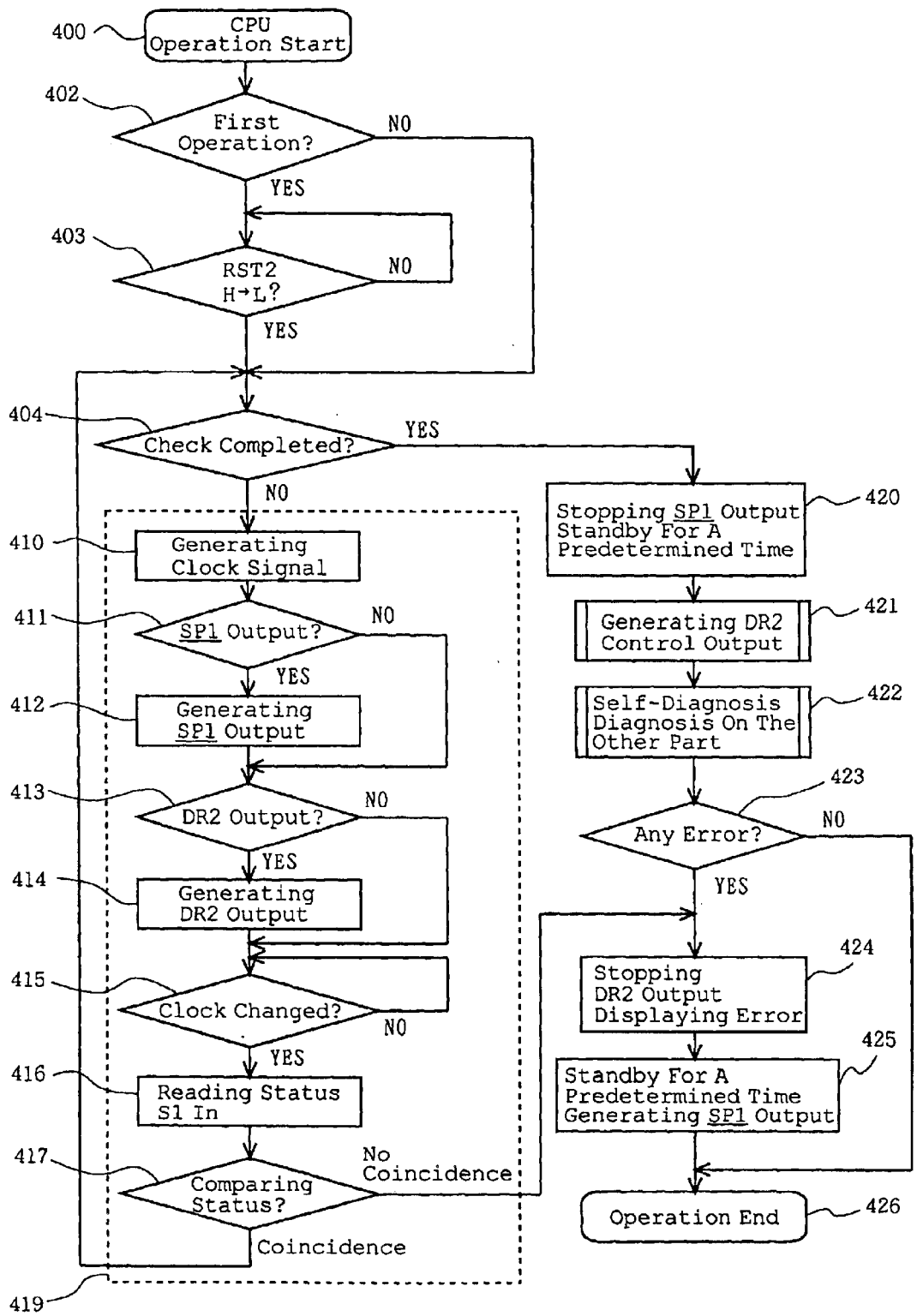
FIG. 7 is a flowchart for explaining a drive control operation of the engine air-intake control device according to the second embodiment.

FIG. 7 is a flowchart for explaining a drive control operation of the control device (engine air-intake control device) 100b shown in FIG. 5.

With reference to FIG. 7, numeral 400 is an operation start step of the microprocessor CPU in the drive control circuit 110b. Numeral 402 is a step that operates subsequently to step 400, and discriminates whether or not it is a first operation depending on whether or not a first operation flag, not shown, is operated which flag is set when a logic level of a reset output pulse RST2 has changed from "H" to "L" in the following step 403. Numeral 403 is a standby step that operates when step 402 discriminates the first operation, and receives a reset output pulse RST2 to wait for a logic level thereof to change from "H" to "L". Numeral 404 is a step that operates when the above-mentioned step 420 has discriminated that it is not the first operation, or subsequently to the above-mentioned step 403 or step 417 as described later, and determines whether or not the clock waveform (C) has proceeded until the completion of a startup sequence. In this step 404, it is determined whether or not a clock counter, not shown, exceeds a count value of 10.

Numeral 410 is a step that operates when the above-mentioned step 404 determines non-completion, and generates a clock signal by one pulse. Numeral 411 is a step that operates subsequently to step 410, and discriminates whether or not it is timing of generating a feed-inhibit output SP1 based on the time chart of FIG. 6. Numeral 412 is a step that operates when step 411 discriminates YES, and generates the feed-inhibit output SP1. Numeral 413 is a step that operates when the above-mentioned step 411 discriminates NO, or subsequently to step 412, and discriminates whether or not it is timing of generating the conduction drive output DR2 based on the time chart of FIG. 6. Numeral 414 is a step that operates when the above-mentioned step 413 discriminates YES, and generates the conduction drive output DR2. Numeral 415 is a determination standby step that operates when the above-mentioned step 413 discriminates NO, or subsequently to step 414, and stands by for operation until a current clock signal changes from logic level "H" to "L".

Numeral 416 is a step that operates when step 415 has determined the presence of change in clock signal, and reads a status signal S1 in. Numeral 417 is a step that operates subsequently to step 416, and compares a logic level of a normal status signal having been preliminarily stored with a logic level having been read in by step 416. When this step 417 determined coincidence, the program proceeds to the above-mentioned step 404.

Numeral 419 is a step block formed of the above-mentioned steps 410 to 417. This step block represents steps of operation start permission (i.e., steps of operation start permission means in the drive control circuit 110b.

Numeral 420 is a step that operates subsequently to the above-mentioned step 404 when all the operations of step block 419 acting as the above-mentioned operation start permission means have completed normally, and stops the feed-inhibit output SP1 (logic level SP1="H") to bring into a state capable of feeding an electric power as well as performs the standby for a predetermined time period corresponding to a response time period from the power feed to the electromagnetic coil 108 until a complete closed circuit of the switch contact 109. This step 420 is a step of preceding application means that makes the conduction drive output active after a predetermined time period has passed since the feed drive output being active.

Numeral 421 is an automatic control step that operates subsequently to step 420, and generates a ratio control output of the conduction drive output DR2 in response to a detection output from the accelerator position sensor APS or the throttle position sensor TPS in the analog sensor group 105b. Numeral 422 is a step that operates subsequently to step 421, and detects presence or absence of any error by a method of a self-diagnosis carried out by the drive control circuit 110*b*, or a diagnosis on the other part with respect to the monitoring control circuit 140*b*.

Numeral 423 is a step that operates subsequently to the above-mentioned step 422, and determines whether or not any error has been detected by step 422. Numeral 424 is a step that operates when the above-mentioned step 417 has determined non-coincidence (specifically, comparing a logic level of a normal status signal having been preliminarily stored with a logic level having been read in by step 416 to determine non-coincidence), or when the above-mentioned step 423 has determined the presence of the error, and stops a conduction control output DR2 to interrupt the transistor 117 as well as generates an error alarm display output via the serial communication circuit 113 with respect to the alarm display in the electrical load group 106.

Numeral 425 is a step that operates subsequently to step 424, causes a feed-inhibit output SP1 to come to logic level "L" after a predetermined time period, that is a time period of the likelihood of attenuation in which current through the motor 107 is interrupted, and interrupts the feed drive transistor 148 and to interrupt a power supply circuit of the motor 107 by means of the switch contact 109. This step 425 is a step carried out by the delay interruption means for making a feed-inhibit output active after a predetermined time period has passed since the stop of a conduction drive output.

Numeral 426 is a standby step that operates when the above-mentioned step 423 has determined the absence of error, or subsequently to the above-mentioned step 425, and ends a periodical control operation. The microprocessor CPU forming the drive control circuit 110*b* implements other control operations and thereafter activates the operation start step 400 again.

Figure 8:
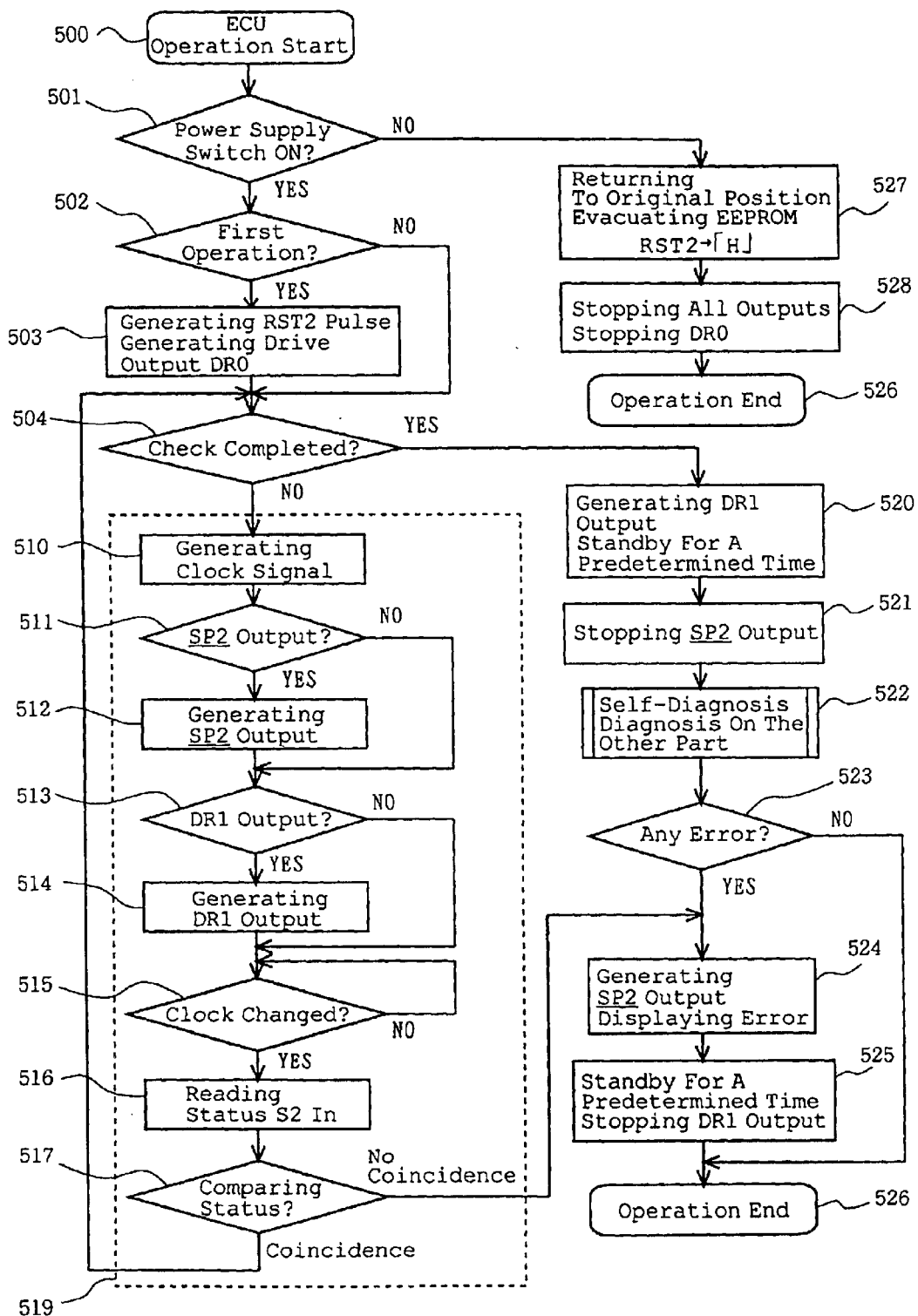
FIG. 8 is a flowchart for explaining a monitoring control operation of the engine air-intake control device according to the second embodiment.

FIG. 8 is a flowchart for explaining monitoring control operation at the monitoring control circuit 140*b* of the control device (engine air-intake control device) shown in FIG. 5.

With reference to FIG. 8, numeral 500 is an operation start step of the microprocessor ECU in the monitoring control circuit 140*b*. Numeral 501 is a step that operates subsequently to step 500, and determines whether or not the power supply switch 102 is ON. Numeral 502 is a step that operates when step 501 determines YES, and discriminates whether or not it is the first operation depending on whether or not the power supply relay drive output DR0 is generated in the following step 503. Numeral 503 is a step that operates when step 502 has determined the first operation, and generates a reset output pulse RST2 as well as generates the operation holding drive output DR0 of the electromagnetic coil 103. Numeral 504 is a step that operates when the above-mentioned step 502 discriminates it is not the first operation, or subsequently to the above-mentioned step 503 or a step 517 as described later, and determines whether or not the clock waveform (B) of FIG. 6 has proceeded until the completion of a startup sequence. In this step 504, it is determined whether or not a clock counter, not shown, exceeds a count value of 10.

Numeral 510 is a step that operates when the above-mentioned step 504 has determined non-completion, and generates a clock signal by one pulse. Numeral 511 is a step that operates subsequently to step 510, and discriminates whether or not it is timing of generating a conduction-inhibit output SP2 based on the time chart of FIG. 6. Numeral 512 is a step that operates when step 511 discriminates YES, and generates the conduction-inhibit output SP2. Numeral 513 is a step that operates when the above-mentioned step 511 discriminates NO, or subsequently to step 512, and discriminates whether or not it is timing of generating a feed drive output DR1 based on the time chart of FIG. 6. Numeral 514 is a step that operates when step 513 discriminates YES, and generates a feed drive output DR1. Numeral 515 is a determination standby step that operates when the above-mentioned step 513 discriminates NO, or subsequently to step 514, and stands by for operation until a current clock signal changes from logic level "H" to "L". Numeral 516 is a step that operates when step 515 has determined the presence of change of a clock signal, and reads a status signal S2 in. Numeral 517 is a step that operates subsequently to step 516, and compares a logic level of a normal status signal having been preliminarily stored with a logic level having been read in by step 516. When this step 517 determines coincidence, the program proceeds to the above-mentioned step 504.

Numeral 519 is a step block formed of the above-mentioned steps 510 to 517. This step block 519 represents steps of the operation start permission (that is, steps of operation start permission means in the monitoring control circuit 140*b*).

Numeral 520 is a step that operates subsequently the above-mentioned step 504 when all the operations of the above-mentioned step block 519 acting as the above-mentioned operation start permission means have normally completed, and generates a feed drive output DR1 as well as stands by for a predetermined time period corresponding to a response time period from energizing the electromagnetic coil 108 until a complete closed circuit of the switch contact 109. Numeral 521 is a step that operates subsequently to step 520, and stops the conduction-inhibit output SP2 (SP2="H") to bring the transistor 117 into a state capable of conduction. Numeral 522 is a step that operates subsequently to step 521, and detects presence or absence of any error in a manner of self-diagnosis by means of the monitoring control circuit 140*b*, or diagnosis on the other part with respect to the drive control circuit 110*b*.

Numeral 523 is a step that operates subsequently to the above-mentioned step 522, and determines whether or not any error has been detected by step 522. Numeral 524 is a step that operates when the above-mentioned step 517 determines non-coincidence, or the above-mentioned step 523 has determined the presence of the error, and generates the conduction-inhibit output SP2 to come to logic level "L", thereby interrupting the transistor 117, as well as generates an alarm display output with respect to the alarm display in the electrical load group 106. Numeral 525 is a step that operates subsequently to step 524, and waits for a current attenuation time period of the motor 107, and stops the feed drive output DR1 to de-energize the electromagnetic coil 108 resulting in interruption of a power supply circuit of the motor 107. Numeral 526 is a standby step that operates when the above-mentioned step 523 determines the absence of the error, or subsequently to the above-mentioned step 525, and ends a periodical control operation. The microprocessor ECU constituting the monitoring control circuit 140*b* carries out other control operations, and thereafter to activates the operation start step 500 again.

Numeral 527 is a step that operates when the above-mentioned step 501 determines that the power supply switch is OFF, and, e.g., causes the stepping motor for driving an exhaust gas recirculation valve to return to in an origin position; stores and evacuates various learning information, error history information or the like, which are stored in the operation memory 151, with respect to the nonvolatile memory such as EEPROM memory, not shown, provided in the monitoring control circuit 140*b*; or causes the reset output RST2 to come to logic level "H" to transmit it with respect to the drive control circuit 110b. Numeral 528 is a step for stopping a drive output DR0 of the power supply relay or all outputs generated from the monitoring control circuit 140b. Following this step 528, the program proceeds to an operation end step 526.

Embodiment 3.

Figure 9:
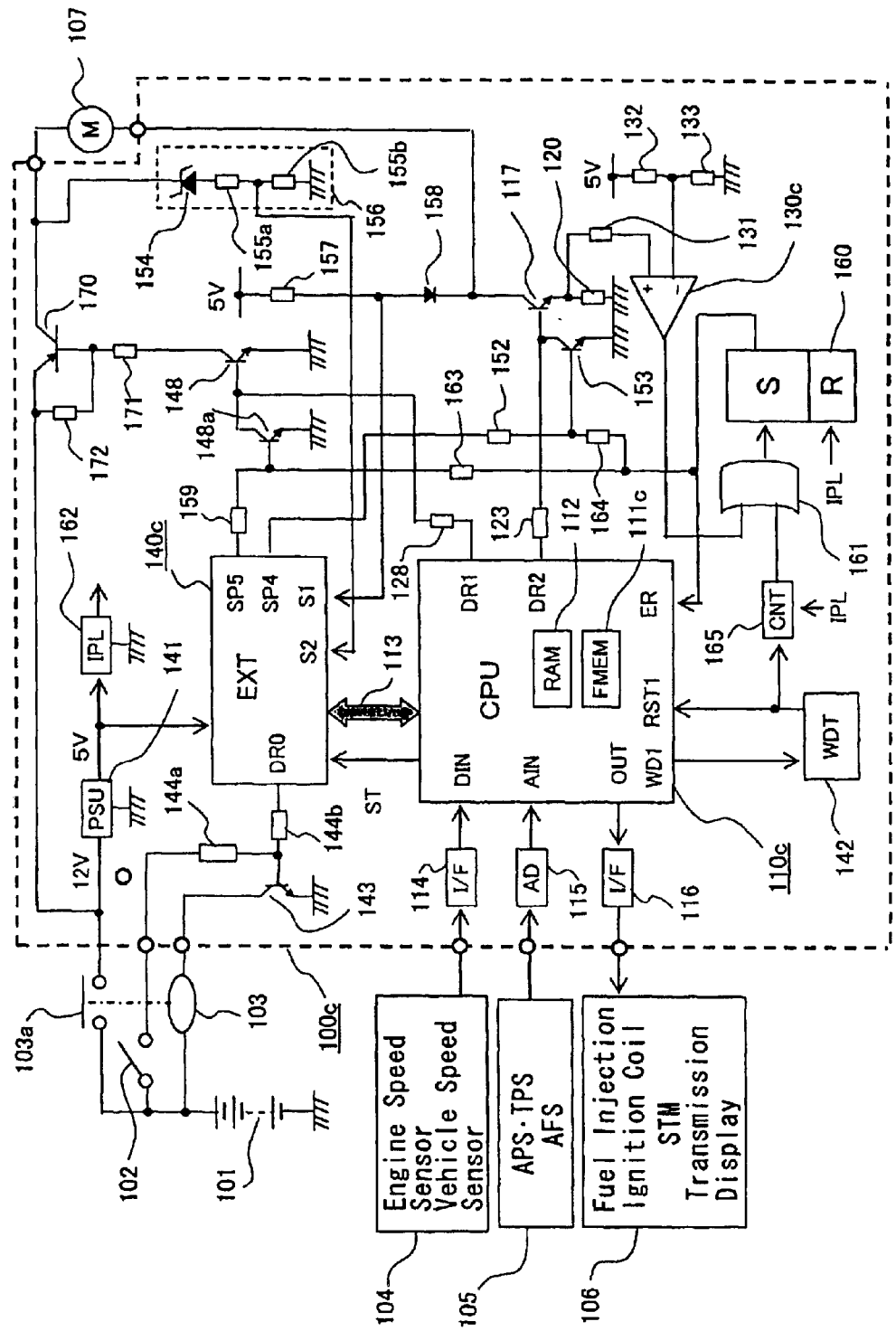
FIG. 9 is a block diagram showing constitution of an engine air-intake control device according to a third preferred embodiment.

FIG. 9 is a block diagram showing constitution of an engine air-intake control device according to a third preferred embodiment of this invention.

With reference to FIG. 9, reference numeral 100c designates an engine air-intake control device (merely, also abbreviated as a control device) including fuel injection control means and the like with respect to an on-vehicle engine. First, external input/output apparatus connected to the engine air-intake control device via a connector, not shown, are described.

Numeral 101 designates an on-vehicle battery, for example, of 12V the negative-side terminal of which is connected to a vehicle body. Numeral 102 designates a power supply switch, for example, an ignition switch connected between the forgoing battery 101 and the control device 100c. Numeral 103 designates an electromagnetic coil connected between the above-mentioned control device 100c and the battery 101. Numeral 103a designates a switch contact that closes a circuit thereof when the foregoing electromagnetic coil 103 is energized to provide connection between the above-mentioned battery 101 and the control device 100c. The above-mentioned electromagnetic coil 103 and the switch contact 103a form a power supply relay for opening and closing a main power supply circuit of the above-mentioned control device 100c.

Numeral 104 designates a switch sensor group such as engine speed sensor, crank angle sensor, vehicle speed sensor. Numeral 105 designates an analog sensor group such as airflow sensor AFS for measuring an air-intake of a throttle, accelerator position sensor APS for measuring a depression degree of an accelerator pedal, throttle position sensor TPS measuring a throttle valve opening. Numeral 106 designates an electrical load group such as ignition coil of an engine, fuel injection electromagnetic valve, stepping motor for driving an exhaust gas recirculation valve, gear level switching electromagnetic valve of a transmission, and various alarm displays. Numeral 107 designates a motor for performing an open/close drive of an intake valve. This motor is fed with an electric power from the above-mentioned battery 101 via the switch contact 103a and a transistor 170 as described later. The above-mentioned transistor 170 acts as a load-circuit power-supply-interruption element.

Now, an internal constitution of the control device 100c is described. Numeral 110c designates a drive control circuit constituted so that a microprocessor CPU may be a principal component. Numeral 111c designates a program memory, for example, a flash memory cooperating with the above-mentioned microprocessor CPU. Numeral 112 designates an operation memory, specifically, a RAM memory cooperating with the above-mentioned microprocessor CPU. Numeral 113 designates a serial communication circuit connected between the above-mentioned microprocessor CPU and a monitoring control circuit 140c as described later.

Numeral 114 designates an input interface circuit connected between the above-mentioned switch sensor group 104 and a DIN port of the drive control circuit 110c. Numeral 115 designates a multi-channel AD converter connected between the above-mentioned analog sensor group 106 and an AIN port of the drive control circuit 110c. Numeral 116 designates an output interface circuit connected between the above-mentioned electrical load group 106 and an OUT port of the drive control circuit 110c. Numeral 117 designates a driving switch element that is connected in series to the above-mentioned motor 107, and performs a variable ON/OFF ratio operation to control a power feed amount with respect to the motor 107. As this switching element, for example, NPN-type power transistor is employed.

Numeral 120 designates a current detection resistor connected to an emitter terminal of the above-mentioned transistor 117 (driving switch element). To this current detection resistor, current of the motor 107 flows from the battery 101 through the switch contact 103a, transistor 170, motor 107 and transistor 117.

Numeral 123 designates a conduction drive resistor connected between a conduction drive output DR2 of the above-mentioned drive control circuit 110c and a base terminal of the above-mentioned transistor 117. When the above-mentioned conduction drive output DR2 generates a drive output to come to logic level "H", the above-mentioned transistor 117 comes to be in conduction.

Numeral 128 designates a feed drive resistor connected between a feed drive output DR1 of the above-mentioned drive control circuit 110c and a base terminal of a feed drive transistor 148 as described later. When the above-mentioned feed drive output DR1 generates a drive output to come to logic level "H", the above-mentioned transistor 148 is brought into conduction.

Numeral 130c designates a comparison detection circuit. Numeral 131 designates an input resistor connected between a positive-side input terminal of the foregoing comparison detection circuit and the above-mentioned current detection resistor 120. Numerals 132, 133 designate voltage dividing resistors that divide an output voltage from a control power supply 141 as described later, and input the divided voltage to a negative-side terminal of the above-mentioned comparison detection circuit 130c. When voltage across the above-mentioned current detection resistor 120 comes to be larger than the divided voltage provided by the above-mentioned voltage dividing resistors 132, 133, an output from the above-mentioned comparison detection circuit 130c comes to logic level "H", and sets an error storage circuit 160 as described later, via an OR element 161, as described later.

Numeral 140c designates a monitoring control circuit that monitors operations of the drive control circuit 110c while performing a signal communication to each other via the serial communication circuit 113 with the above-mentioned drive control circuit 110c. Numeral 141 designates a control power supply that is fed with an electric power from the battery 101 via the above-mentioned switch contact 103a, and generates a stabilized voltage of DC5V. Numeral 142 designates a watchdog timer for monitoring operations of the microprocessor CPU constituting the above-mentioned control circuit 110c. This watchdog timer is arranged so as to generate a reset output pulse RST 1 to start up the above-mentioned microprocessor CPU again when a pulse width of a watchdog signal WD1, specifically, a pulse train, which the microprocessor CPU generates, exceeds a predetermined value.

Furthermore, it is a usual arrangement that the above-mentioned monitoring control circuit 140c is formed as one integrated circuit including the above-mentioned watchdog timer 142 or a constant voltage control circuit section of the control power supply 141. In this third embodiment, however, the above-mentioned monitoring control circuit 140c is formed of a logic circuit without any microprocessor.

Numeral 143 designates a transistor connected to the above-mentioned electromagnetic coil 103. Numeral 144a designates a drive resistor connected between the above-mentioned power supply switch 102 and a base terminal of the transistor 143. Numeral 144b designates a drive resistor connected between a drive output DR0 of the above-mentioned monitoring control circuit 140c and a base terminal of the above-mentioned transistor 143. When the power supply switch 102 is brought into a closed circuit, the transistor 143 is driven from the battery 101, and then the electromagnetic coil 103 is energized.

Besides, the above-mentioned drive output DR0 from the monitoring control circuit 140c comes to logic level "H" responsive to receiving a start signal ST that the drive control circuit 110c generates.

Once the electromagnetic coil 103 has been energized to bring the switch contact 103a into a closed circuit, the transistor 143 is brought into conduction to drive in response to a drive output DR0. Therefore, even if the power supply switch 102 comes to be in an open circuit, operation of the electromagnetic coil 103 is continued and held until the drive output DR0 is stopped. During this time period, initialization of the monitoring control circuit 140c and the drive control circuit 110c is implemented.

Numeral 148 designates a feed drive transistor the collector terminal of which is connected to a base terminal of a transistor 170 as described later, via the base resistor 171. Numeral 148a designates a feed-inhibit transistor connected to a base terminal of the above-mentioned feed drive transistor 148. When the above-mentioned feed drive output DR1 comes to logic level "H", the feed drive transistor 148 is brought conduction, and then the transistor 170 is brought into conduction. However, when the feed-inhibit output SP5 comes to logic level "H", it is arranged such that the feed-inhibit transistor 148a is brought into conduction, and the feed drive transistor 148 is brought into non-conduction.

In addition, numeral 170 designates a PNP-type power transistor that is connected between the above-mentioned switch contact 103a and the motor 107, and acts as a load circuit power supply interruption element. Numeral 171 designates a base resistor for driving the foregoing transistor 170. Numeral 172 designates a ballast resistor connected to a base terminal of the foregoing transistor 170.

Numeral 152 designates a conduction inhibit resistor connected between a conduction-inhibit output SP4 of the above-mentioned monitoring control circuit 140c and a base terminal of a conduction-inhibit transistor 153. Numeral 153 designates a conduction-inhibit transistor connected to a base terminal of the above-mentioned transistor 117 acting as the above-mentioned driving switch element. When the above-mentioned conduction-inhibit output SP4 generates an inhibit output to come to logic level "H", or when the above-mentioned error storage signal ER comes to logic level "H", it is arranged such that the conduction-inhibit transistor 153 is brought into conduction, while the transistor 117 acting as a driving switch element is brought into non-conduction.

Numeral 154 designates a constant voltage diode having a voltage DR0p slightly larger than an output voltage from the above-mentioned control power supply 141. Numerals 155a, 155b designate voltage-dividing resistors. Numeral 156 designates a closed circuit detection circuit where the above-mentioned constant voltage diode 154 and the voltage dividing resistors 115a, 155b are connected in series. This close circuit detection circuit is connected to the battery 101 via the above-mentioned switch contact 103a and the transistor 107. A divided voltage provided by the voltage dividing resistors 155a, 155b is supplied to the above-mentioned monitoring control circuit 140c as a status signal S2.

Numeral 157 designates a resistor element connected to an output terminal of the above-mentioned control power supply 141. Numeral 158 designates a diode connected between this resistor element and a collector terminal of the above-mentioned transistor 117. Further a dummy load circuit is formed, in which a minute current flows from the control power supply 141 through the resistor element 157 and the diode 158 when the transistor 117 is energized.

A connection point between the above-mentioned resistor element 157 and diode 158 is connected to the above-mentioned monitoring control circuit 140c as a status signal S1.

Numeral 159 designates a feed-inhibit resistor connected between a feed-inhibit output SP5 of the above-mentioned monitoring control circuit 140c and a base terminal of the above-mentioned feed-inhibit transistor 148a. When a feed-inhibit output SP5 is generated to come to logic level "H", the feed-inhibit transistor 148a becomes into conduction, and the feed drive transistor 148 becomes into non-conduction to bring the transistor 170 into non-conduction.

Numeral 160 designates an error storage circuit set via an OR element 161. Numeral 161 designates an OR element to which an output from the above-mentioned comparison detection circuit 130c, and a count-up output from a count circuit 165 as described later, are inputted. Numeral 162 designates a power supply pulse generation circuit that generates a power supply pulse signal IPL when the power supply switch 102 is turned on. The above-mentioned error storage circuit 160 is reset in response to the foregoing power supply pulse signal IPL.

Numeral 163 designates a feed-inhibit resistor connected between an output terminal of the above-mentioned error storage circuit 160 and a base terminal of the above-mentioned feed-inhibit transistor 148a. Numeral 164 designates a conduction inhibit resistor connected between an output terminal of the above-mentioned error storage circuit 160 and a base terminal of the above-mentioned conduction-inhibit transistor 153. When an error storage signal ER, being an output from the above-mentioned error storage circuit 160 is at logic level "H", the feed-inhibit transistor 148a and the conduction-inhibit transistor 153 are brought into conduction.

Numeral 165 designates a count circuit that counts the number of times of generation of a reset output pulse RST1, which the above-mentioned watchdog timer 142 generates, and generates a count-up output when a cumulative count value exceeds a predetermined value. The count value of the foregoing count circuit is reset in response to the above-mentioned power supply pulse signal IPL as well.

Now, operations of the engine air-intake control device according to this third embodiment shown in FIG. 9 are described.

First, when the power supply switch 102 is brought into a closed circuit, the electromagnetic coil 103a, which constitutes the power supply rely, is energized resulting in a closed circuit of the switch contact 103a, and an electric power is fed to the control power supply 141 resulting in generation of a ballast constant voltage DC 5V.

The drive control circuit 110c or monitoring control circuit 140c is fed with an electric power from the control power supply 141 and starts operation, and the drive control circuit 110c supplies a start signal ST with respect to the monitoring control circuit 140c.

Figure 10:
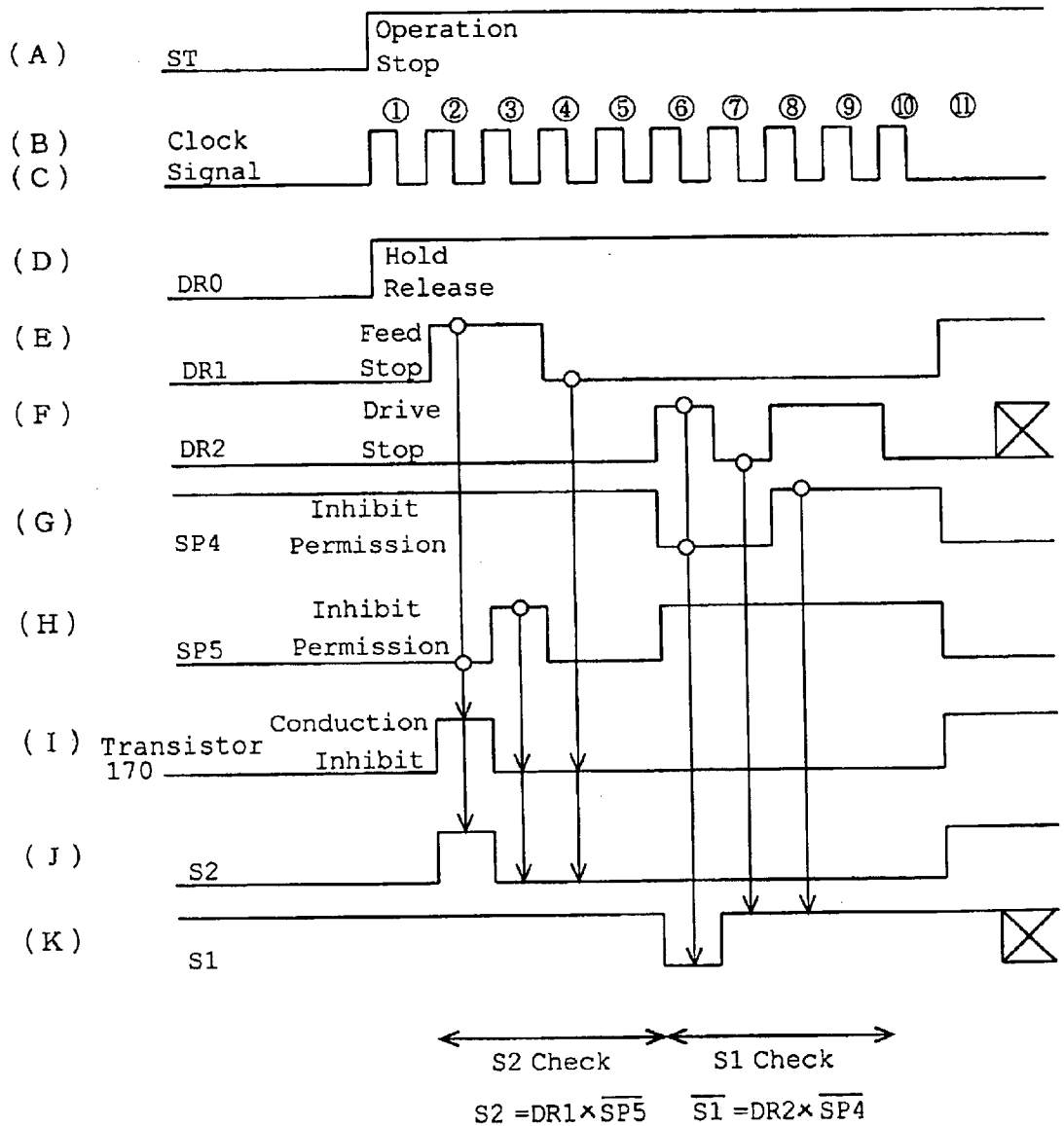
FIG. 10 is a time chart for explaining a startup sequence of the engine air-intake control device according to the third embodiment.

As a result, a drive output DR0 is generated, and a startup sequence as described later with reference to FIG. 10, is carried out eventually coming to be in a normal operation state.

In the normal operation state, first the drive control circuit 110c generates a feed drive output DR1 to bring the transistor 170 into conduction via the feed drive transistor 148.

Subsequently, the drive control circuit 110c shown in this third embodiment drives and controls the electrical load group 106 in accordance with an operation state of the switch sensor group 104 or the analog sensor group 105 and contents in the program memory 11c, as well as generates a conduction drive output DR2 in accordance with a detection output from the accelerator position sensor APS or the throttle position sensor TPS with the analog sensor group 105 and contents in the program memory 111c, and performs an ON/OFF ratio control of the transistor 117.

As a result, the motor 107 operates so that a throttle valve opening may correspond to a depression degree of the accelerator pedal.

On the other hand, the drive control circuit 110c carries out self diagnosis such as whether or not there is any disconnection and short circuit fault at the accelerator position sensor APS and the throttle position sensor TPS, or whether or not any error is present in the program memory 111c, or carries out monitoring on the other part such as whether or not a serial communication with the monitoring control circuit 140c is conducted normally. At the time of detecting any abnormality, the drive control circuit 110c stops a conduction drive output DR2, as well as stops a feed drive output DR1 to bring the feed transistor 148 into non-conduction, and to bring the transistor 170 into non-conduction, resulting in interruption of a power supply circuit of the motor 107.

Likewise, the monitoring control circuit 140b monitors an operation state of the drive control circuit 110c while performing a data communication with the drive control circuit 110c via the serial communication circuit 113. At the time of detecting the abnormality, the monitoring control circuit 140c generates a conduction-inhibit output SP4 to bring the transistor 117 into non-conduction as well as generates a feed-inhibit output SP5 to bring the feed-inhibit transistor 148a into conduction resulting in interruption of a power supply circuit of the motor 107 via the feed drive transistor 148 and the transistor 170.

Furthermore, when current flowing through the current detection resistor 120 becomes excessively large due to, e.g., a short circuit fault at the motor 107 and a connection wiring, the comparison detection circuit 130c operates to set the error storage circuit 160, and generates an error storage signal ER, being an output from the error storage circuit 160, to interrupt a power supply circuit of the motor 107, or to bring the transistor 117 into non-conduction by the action of the feed-inhibit resistor 163 or the conduction inhibit resistor 164.

Furthermore, when the microprocessor CPU in the drive control circuit 110c runs away, it is activated again responsive to a reset output pulse RST1 of the watchdog timer 142. However, when there are a large number of times of generation of reset output pulse RST1, the count circuit 165 generates a count-up output to set the error storage circuit 160. Therefore, responsive to this error storage signal ER, the transistor 170 and transistor 117 continue to be in a state of non-conduction.

In this state, an evacuation operation is performed by means of the drive control circuit 110c without depending on the control of opening and closing a throttle valve by means of the motor 107.

Thus, the drive control circuit 110c can stop the motor via the transistor 117 by stopping a conduction drive output DR2 as well as can interrupt a power supply circuit of the motor 107 via the transistor 148 and the transistor 170 by stopping a feed drive output DR1.

Likewise, the monitoring control circuit 140c can interrupt a power supply circuit of the motor 107 via the feed-inhibit transistor 148a, the feed drive transistor 148 and the transistor 170 by generating a feed-inhibit output SP5, as well as can stop the motor 197 via the conduction-inhibit transistor 153 and the transistor 117 with a conduction-inhibit output SP4.

Meanwhile, at the startup of operation of the control device, presence or absence of any fault is discriminated by intentionally causing a feed drive output DR1, a feed-inhibit output SP5, a conduction drive output DR2 and a conduction-inhibit output SP4 to operate based on a startup sequence shown in FIG. 10 and monitoring status signals S1 and S2. Further an operation control starts after the absence of error has been confirmed.

FIG. 10 is a time chart for explaining a startup sequence of the control device (engine air-intake control device) 100c shown in FIG. 9.

With reference to FIG. 10, (A) is a start signal ST that the drive control circuit 110c generates. (B) is a clock signal generated in the drive control circuit 110c generated simultaneously with the generation of this start output ST. (C) is a clock signal generated in the monitoring control circuit 140c at the point of receiving the above-mentioned start signal ST. Although the foregoing clock signal (C) has a slight time delay with respect to the above-mentioned clock signal (B), it is represented so as to operate at the same timing as the above-mentioned clock signal (B) as a matter of convenience.

(D) shows a drive output DR0 of the power supply relay that the monitoring control circuit 140c generates. This drive output DR0 is being at logic level "H" on and from the point of rising edge of the first pulse of the above-mentioned clock signal (C).

(E) is a waveform of a feed drive output DR1 that the drive control circuit 110c generates. (F) is a waveform of a conduction drive output DR2 that the drive control circuit 110c generates. (G) is a waveform of a conduction-inhibit output SP4 that the monitoring control circuit 140c generates. (H) is a waveform of a feed-inhibit output SP5 that the monitoring control circuit 140c generates. These waveforms are changed to logic level "H" or "L" at the point of pulse rising edge of the clock signal (B) or (C).

(I) is an output waveform of the transistor 170. (J) is a waveform of a status signal S2 inputted to the monitoring control circuit 140c. (K) is a waveform of a status signal S1 inputted to the monitoring control circuit 140c. These waveforms are changed to logic level "H" or "L" at the point of pulse rising edge of the clock signal (C).

Besides, the operation of a feed-inhibit output SP5 is confirmed during a time period from the second pulse to the fifth pulse of the clock waveform. During this time period, a status signal S1 is "H" continuously by causing the conduction-inhibit output SP4 to be "H" (SP4="H").

Furthermore, the case where the status signal S2="H" in this state is limited to the case where the feed drive output DR1="H", as well as the feed-inhibit output SP5="L". The status signal S2="L" in the case where the feed drive output DR1="L", or the feed-inhibit output SP5="H".

The operation of the conduction-inhibit output SP4 is confirmed during a time period from the sixth pulse to the ninth pulse of the clock waveform. During this time period, the status signal S2="L" continuously by causing a feed-inhibit output SP5 to be "H".

Moreover, the case where the status signal S1="L" in this state is limited to the case where the conduction drive output DR2="H", as well as the conduction-inhibit output SP4="L". The status signal S1="H" in the case where the conduction drive output DR2="L", or the conduction-inhibit output SP4="H".

The tenth pulse of the clock waveform is in a standby state in which the feed drive output DR1="L", the feed-inhibit output SP5="H", the conduction drive output DR2="L", and the conduction-inhibit output SP4="H" thereby completing the startup sequence.

Figure 11:
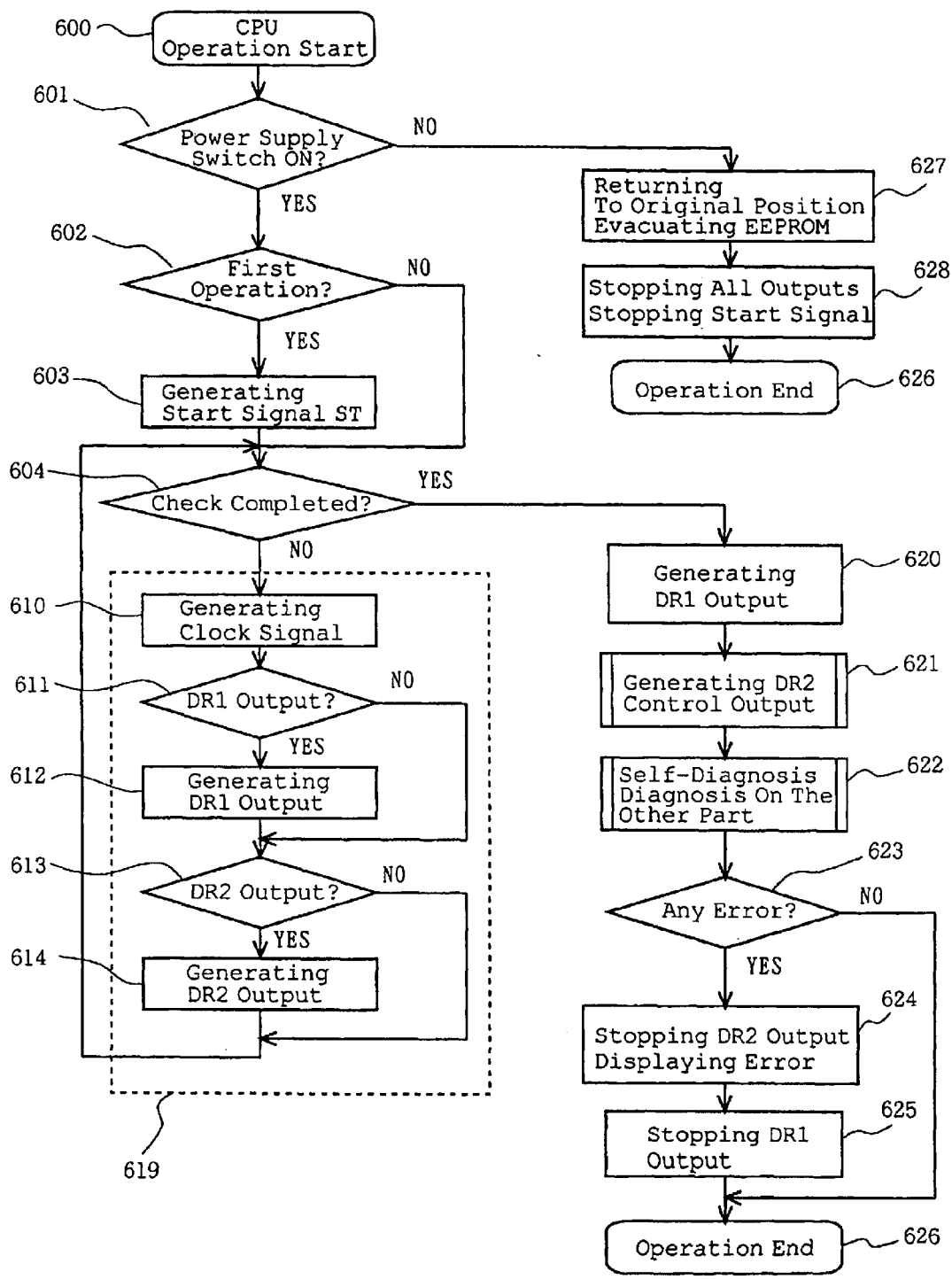
FIG. 11 is a flowchart for explaining a drive control operation of the engine air-intake control device according to the third embodiment.

FIG. 11 is a flowchart for explaining a drive control operation of the control device (engine air-intake control device 100c) shown in FIG. 9.

With reference to FIG. 11, numeral 600 is an operation start step of the microprocessor CPU in the drive control circuit 110c. Numeral 601 is a step that operates subsequently to step 600, and determines whether or not the power supply switch 102 is ON. Numeral 602 is a step that operates when step 601 determines YES, and discriminates whether or not it is the first operation depending on whether or not a start signal ST has been generated in the following step 603. Numeral 603 is a step that operates when step 602 has discriminated it the first operation, and generates a start signal ST. Numeral 604 is a step that operates when the above-mentioned step 602 discriminates that it is not the first operation, or subsequently to the above-mentioned step 603 or a step 614 as described later, and determines whether or not the clock waveform (B) of FIG. 10 has advanced until the completion of a startup sequence. This step 604 determines whether or not a clock counter, not shown, exceeds a count value of 10.

Numeral 610 is a step that operates when the above-mentioned step 604 has determined non-completion, and generates a clock signal by one pulse. Numeral 611 is a step that operates subsequently to step 610, and discriminates whether or not it is timing of generating a feed drive output DR1 based on the time chart of FIG. 10. Numeral 612 is a step that operates when step 611 discriminates YES, and generates a feed drive output DR1. Numeral 613 is a step that operates when the above-mentioned step 611 discriminates NO, or subsequently to step 612, and discriminates whether or not it is timing of generating the conduction drive output DR2 based on the time chart of FIG. 10. Numeral 614 is a step that operates when step 613 discriminates YES, and generates the conduction drive output DR2. When the above-mentioned step 613 discriminates NO, or subsequently to the above-mentioned step 614, the program proceeds to the above-mentioned step 604.

Numeral 619 is a step block formed of the above-mentioned steps 610 to 614. This step block represents steps of operation start permission (that is, steps of operation start permission means in the drive control circuit 110c).

Numeral 620 is a step that operates subsequently to the above-mentioned step 604 when all the operations of the step block 619 acting as the above-mentioned operation start permission means have completed, and generates a feed drive output DR1. Numeral 621 is an automatic control step that operates subsequently to step 620, and responds to a detection output from the accelerator position sensor APS or throttle position sensor TPS in the analog sensor group 105 to generate a ratio control output of a conduction drive output DR2. Numeral 622 is a step that operates subsequently to step 621, and detects presence or absence of any error in a manner of self-diagnosis by means of the drive control circuit 110c or diagnosis on the other part with respect to the monitoring control circuit 140c.

Numeral 623 is a step that operates subsequently to the above-mentioned step 622, and determines whether or not any error has been detected in step 622. Numeral 624 is a step that operates when the above-mentioned step 623 determines the presence of the error, stops a conduction control output DR2 to interrupt the transistor 117, and generates an error alarm display output with respect to the alarm display in the electrical load group 106. Numeral 625 is a step that operates subsequently to step 624, and stops a conduction drive output DR1 to interrupt a power supply circuit of the motor 107 by means of the transistor 170. Numeral 626 is a standby step that operates when the above-mentioned step 623 determines the absence of error, or subsequently to the above-mentioned step 625, and ends a periodical control operation. The microprocessor CPU constituting the drive control circuit 110c carries out other control operations, and thereafter activates the operation start step 600 again.

Numeral 627 is a step that operates when the above-mentioned step 601 determines that the power supply switch is OFF, and, e.g., causes the stepping motor for driving an exhaust gas recirculation valve to return to its origin position, or stores and evacuates various learning information, error history information or the like, which is stored in the operation memory 112, with respect to a nonvolatile memory such as EEPROM memory, not shown, provided in the drive control circuit 110c. Numeral 628 is a step stopping a start signal ST or all outputs that the drive control circuit 110c generates. Subsequently to this step 628, the program proceeds to the operation end step 626.

In addition, due to the fact that a start signal ST has been stopped in the above-mentioned step 628, a drive output DR0 of the power supply relay is stopped at the monitoring control circuit 140c, and the electromagnetic coil 103 is de-energized, resulting in interruption of supplying a power supply with respect to the control device 100c.

Figure 12:
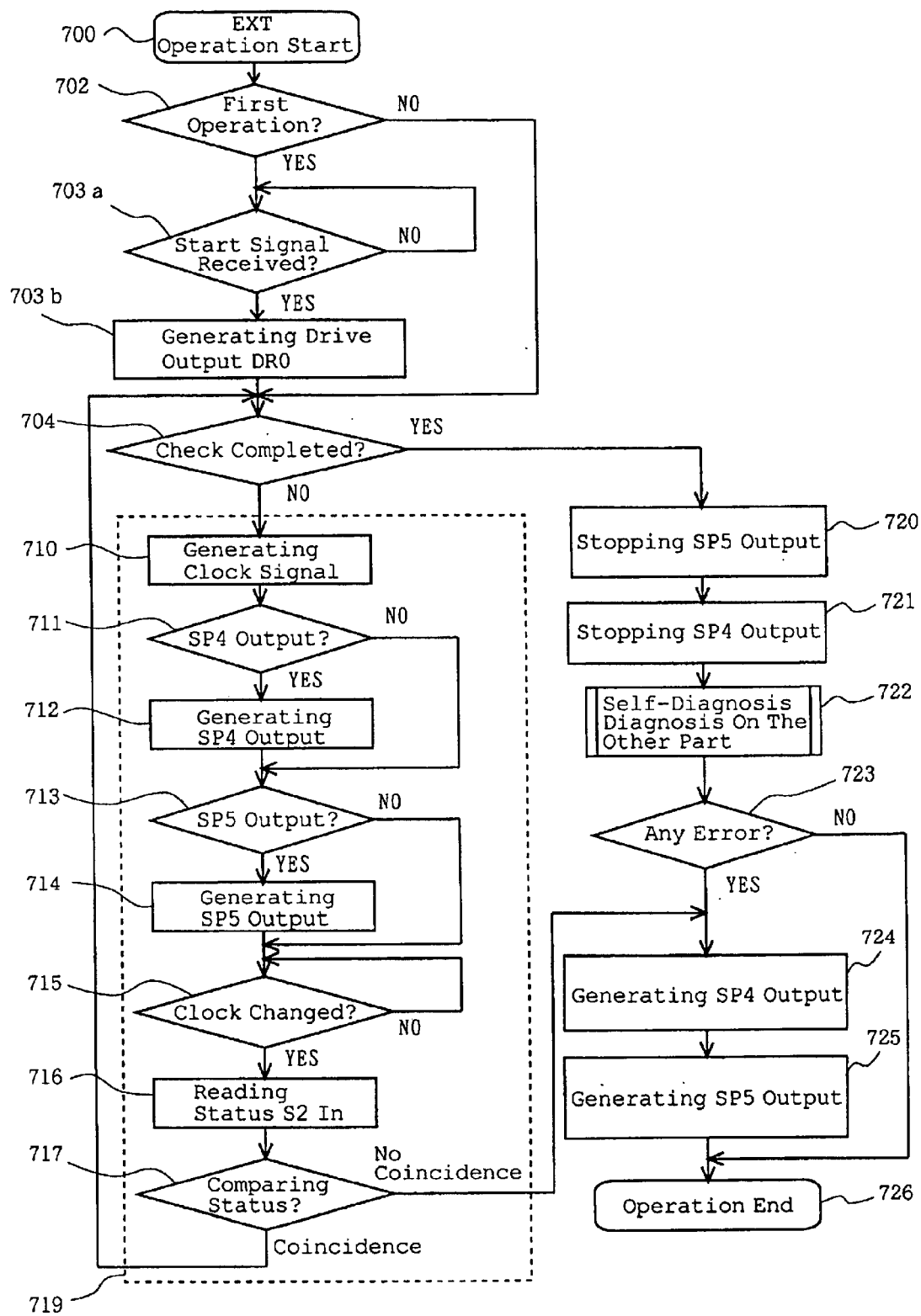
FIG. 12 is a flowchart for explaining a monitoring control operation of the engine air-intake control device according to the third embodiment.

FIG. 12 is a flowchart for explaining a monitoring control operation of the control device (engine air-intake control device) shown in FIG. 9.

With reference to FIG. 12, Numeral 700 is an operation start step. Numeral 702 is a step that operates subsequently to step 700, and discriminates whether or not it is the first operation depending on whether or not a power supply relay drive output DR0 has been generated in the following step 703b as described later. Numeral 703a is a standby step that operates when step 702 has discriminated it the first operation, and performs the standby until receiving a start signal ST. Numeral 703b is a step that operates when step 703a determines receiving a start signal ST, and generates a drive output DR0 of the power supply relay. Numeral 704 is a step that operates when the above-mentioned step 702 discriminates that it is not the first operation, or subsequently to the above-mentioned step 703b or a step 717 as described later, and determines whether or not the clock waveform (C) of FIG. 10 has advanced until the completion of a startup sequence. This step 704 determines whether or not a clock counter, not shown, exceeds a count value of 10.

Numeral 710 is a step that operates when the above-mentioned step 704 determines non-completion, and generates a clock signal by one pulse. Numeral 711 is a step that operates subsequently to step 710, and discriminates whether or not it is timing of generating a conduction-inhibit output SP4 based on the time chart of FIG. 10. Numeral 712 is a step that operates when step 711 discriminates YES, and generates a conduction-inhibit output SP4. Numeral 713 is a step that operates when the above-mentioned step 711 determines NO, or subsequently to step 712, and discriminates whether or not it is timing of generating a feed-inhibit output SP5 based on the time chart of FIG. 10. Numeral 714 is a step that operates when step 713 discriminates YES, and generates a feed-inhibit output SP5. Numeral 715 is a determination standby step that operates when the above-mentioned step 713 discriminates NO, or subsequently to step 714, and waits for operation until a current clock signal changes from logic level "H" to "L". Numeral 716 is a step that operates when step 715 determines the presence of change in clock signal, and reads status signals S1 and S2 in. Numeral 717 is a step that operates subsequently to step 716, and compares a logic level of a normal status signal having been preliminarily stored with a logic level having read in by step 716. When the foregoing step 717 determines coincidence, the program proceeds to the above-mentioned step 704.

Numeral 719 is a step block formed of the above-mentioned steps 710 to 717. This step block represents steps of operation start permission (that is, steps of operation start permission means in the monitoring control circuit 140c).

Numeral 720 is a step that operates subsequently to the above-mentioned step 704 when all the operations of the step block 719 acting as the above-mentioned operation start permission means have completed, and stops a feed-inhibit output SP5 (at logic level "L") to enable the transistor 170 to come into conduction and to bring the motor 107 into a state capable of feeding an electric power. Numeral 721 is a step that operates subsequently to step 720, and stops a conduction-inhibit output SP4 to bring the transistor 117 into a state capable of conduction. Numeral 722 is a step that operates subsequently to step 721, and detects presence or absence of any error in a manner of self-diagnosis by means of the monitoring control circuit 140c, or diagnosis on the other part with respect to the drive control circuit 110c.

Numeral 723 is a step that operates subsequently to the above-mentioned step 722, and determines whether or not any error has been detected by step 722. Numeral 724 is a step that operates when the above-mentioned step 717 determines non-coincidence or when the above-mentioned step 723 determines the presence of any error, and generates a conduction-inhibit output SP4 to interrupt the transistor 117. Numeral 725 is a step that operates subsequently to step 724, and generates a feed-inhibit output SP5 to interrupt the transistor 170 and to interrupt a power supply circuit of the motor 107. Numeral 726 is a standby step that operates when the above-mentioned step 723 determines the absence of error, or subsequently to the above-mentioned step 725, and ends a periodical control operation. The logic circuit constituting the monitoring control circuit 140c carries out other control operations, and thereafter activates the operation start step 700 again.

Embodiment 4.

Figure 13:
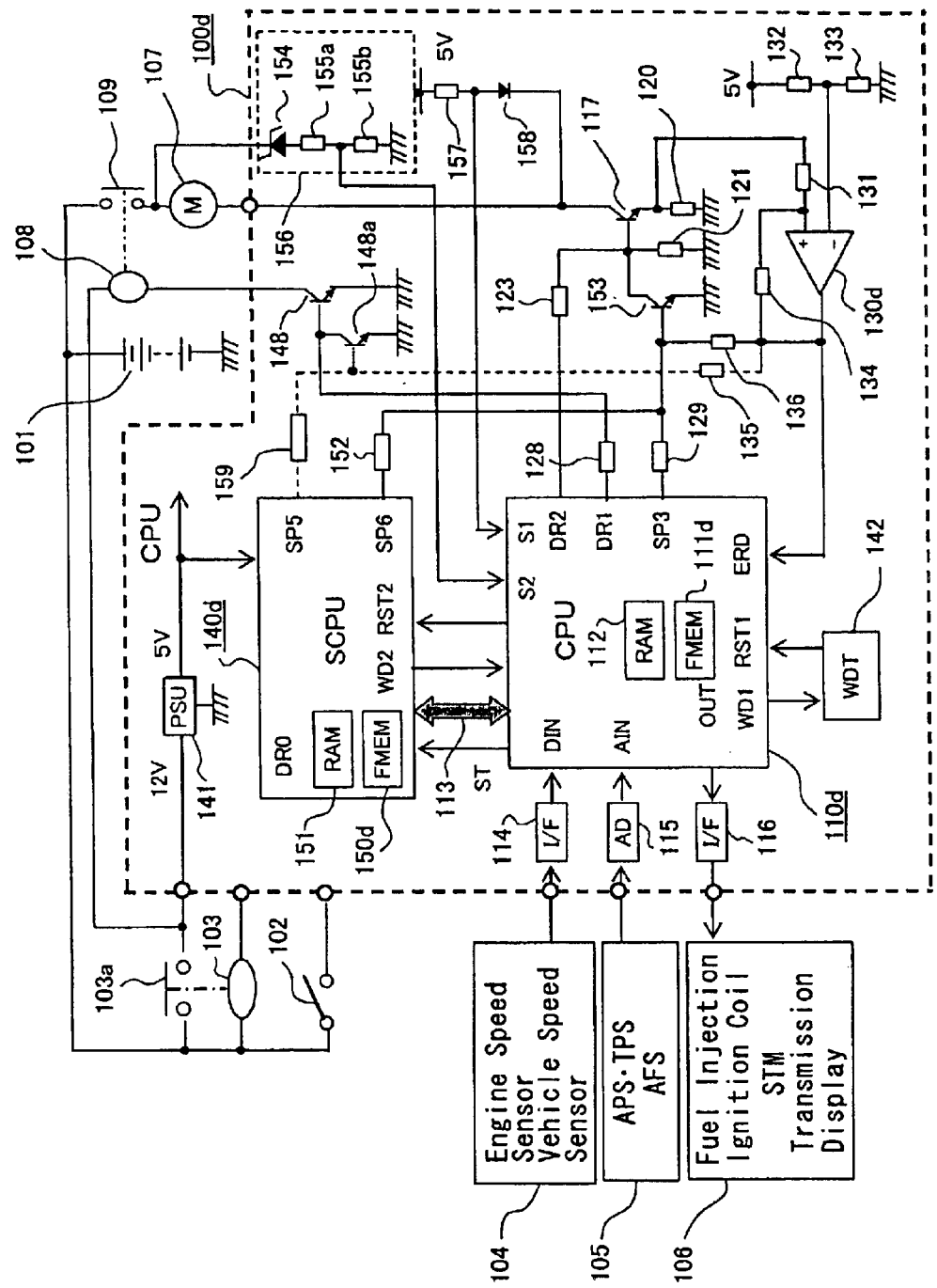
FIG. 13 is a block diagram showing constitution of an engine air-intake control device according to a fourth preferred embodiment.

FIG. 13 is a block diagram showing constitution of an engine air-intake control device according to a fourth preferred embodiment of this invention.

With reference to FIG. 13, reference numeral 100d designates an engine air-intake control device (merely, also abbreviated as a control device) including fuel injection control means and the like with respect to an on-vehicle engine. First, external input/output apparatus connected to the engine air-intake control device via a connector, not shown, is described.

Numeral 101 designates an on-vehicle battery, for example, of 12V the negative-side terminal of which is connected to a vehicle body. Numeral 103a designates a switch contact that closes a circuit thereof when the electromagnetic coil 103a is energized via the power supply switch 102 to provide connection between the above-mentioned battery 101 and the control device 10d. The electromagnetic coil 103 and the switch contact 103a form a power supply relay opening and closing a main power supply circuit of the above-mentioned control device 100d.

Numeral 104 designates a switch sensor group such as engine speed sensor, crank angle sensor, vehicle speed sensor. Numeral 105 designates an analog sensor group such as airflow sensor AFS measuring an air-intake of a throttle, accelerator position sensor APS for measuring a depression degree of an accelerator pedal, throttle position sensor TPS for measuring a throttle valve opening. Numeral 106 designates an electrical load group such as ignition coil of an engine, fuel injection electromagnetic valve, stepping motor for driving an exhaust gas recirculation valve, gear level switching electromagnetic valve of a transmission, and various alarm displays. Numeral 107 designates a motor for performing an open/close drive of an intake valve of the engine. Numeral 108 designates an electromagnetic coil connected between the above-mentioned switch contact 103a and the control device 100d. Numeral 109 designates a switch contact that closes a circuit thereof when the above-mentioned electromagnetic coil 108 is energized, and provides connection between the above-mentioned battery 101 and the motor 107, thus acting as a load circuit power supply element. Further the above-mentioned electromagnetic coil 108 and switch contact 109 form a load relay (load circuit power supply interruption element) for opening and closing a power supply of the motor 107.

Now, an internal constitution of the control device 100d is described. Numeral 110d designates a drive control circuit constituted so that a microprocessor CPU may be a principal component. Numeral 111d designates a program memory, for example, a flash memory cooperating with the above-mentioned microprocessor CPU. Numeral 112 designates an operation memory, specifically, a RAM memory cooperating with the above-mentioned microprocessor CPU. Numeral 113 designates a serial communication circuit connected between the above-mentioned microprocessor CPU and a monitoring control circuit 140c as described later.

Numeral 114 designates an input interface circuit connected between the above-mentioned switch sensor group 104 and a DIN port of the drive control circuit 110d. Numeral 115 designates a multi-channel AD converter connected between the above-mentioned analog sensor group 105 and an AIN port of the drive control circuit 110d. Numeral 116 designates an output interface circuit connect between the above-mentioned electrical load group 106 and an OUT port of the drive control circuit 110d. Numeral 117 designates a driving switch element that is connected in series to the above-mentioned motor 107, and performs a variable ON/OFF ratio operation to control a power feed amount with respect to the motor 107. As this driving switch element, for example, NPN-type power transistor is employed.

Numeral 120 designates a current detection resistor connected to an emitter terminal of the above-mentioned transistor 117 (driving switch element). To this current detection resistor, current of the motor 107 flows from the battery 101 through the switch contact 109, motor 107, and transistor 117.

Numeral 123 designates a conduction drive resistor connected between a conduction drive output DR2 of the above-mentioned drive control circuit 110d and a base terminal of the above-mentioned transistor 117. When the above-mentioned conduction drive output DR2 generates a drive output to come to logic level "H", the above-mentioned transistor 117 is brought into conduction.

Numeral 128 designates a feed drive resistor connected between a feed drive output DR1 of the above-mentioned drive control circuit 110*d* and a base terminal of a feed drive transistor 148 as described later. When the above-mentioned feed drive output DR1 generates a drive output to come to logic level "H", the above-mentioned transistor 148 is brought into conduction.

Numeral 129 designates a conduction inhibit resistor connected between a conduction-inhibit output SP3 of the above-mentioned drive control circuit 110*d* and a base terminal of a conduction-inhibit transistor 53 as described later. When the above-mentioned conduction-inhibit output SP3 generates a conduction-inhibit output to come to logic level "H", the conduction-inhibit transistor 153 comes into conduction to bring the transistor 117 acting as a driving switch element of the motor 107 into non-conduction.

Numeral 130*d* designates a comparison detection circuit for generating an error storage signal ERD to supply it to the above-mentioned drive control circuit 110*d*. Numeral 131 designates an input resistor connected between a positive-side input terminal of the foregoing comparison detection circuit and the above-mentioned current detection resistor 120. Numerals 132, 133 designate voltage dividing resistors that divide an output voltage from a control power supply 141 as described later, and input the divided voltage to a negative-side terminal of the above-mentioned comparison detection circuit 130*c*. Numeral 134 designates a positive feedback resistor connected between the positive-side input terminal and output terminal of the above-mentioned comparison detection circuit 130*d*. Once voltage across the above-mentioned current detection resistor 120 has come to be larger than a divided voltage provided by the above-mentioned voltage-dividing resistor 132, 133, an output from the above-mentioned comparison detection circuit 130*d* continues to be at logic level "H" until the switch contact 103*a* is brought into an open circuit.

Numeral 135 designates a feed-inhibit resistor connected between an output terminal of the above-mentioned comparison detection circuit 130*d* and a base terminal of a feed-inhibit transistor 148*a* as described later. When the error storage signal ERD, being an output from the above-mentioned comparison detection circuit 130*d*, is at logic level "H", the feed-inhibit transistor 148*a* is brought into conduction.

Furthermore, in FIG. 13, a connection between the resistor 135, feed-inhibit transistor 148*a*, and resistor 159 is illustrated using dot lines. This is because there are some cases where the resistor 135, feed-inhibit transistor 148*a* and resistor 159 are not always necessary not to be provided.

Numeral 136 designates a conduction inhibit resistor connected between an output terminal of the above-mentioned comparison detection circuit 130*d* and a base terminal of a conduction-inhibit transistor 153 as described later. When the error storage signal ERD, being an output from the above-mentioned comparison detection circuit 130*d*, is at logic level "H", the conduction-inhibit transistor 153 is brought into conduction.

Numeral 140*d* designates a monitoring control circuit that monitors operations of the drive control circuit 110*d* while performing a signal communication with the above-mentioned drive control circuit 110*d* each other via the serial communication circuit 113. Numeral 141 designates a control power supply to which an electric power that is fed with an electric power from the battery 101 via the above-mentioned switch contact 103*a*, and generates a stabilized voltage of DC 5V. Numeral 142 designates a watchdog timer for monitoring operations of the microprocessor CPU constituting the above-mentioned control circuit 110*d*. This watchdog timer is arranged so as to generate a reset output pulse RST 1 to start up the above-mentioned microprocessor CPU again when a pulse width of a watchdog signal WD1, specifically, a pulse train that the microprocessor CPU generates, exceeds a predetermined value.

Furthermore, above-mentioned monitoring control circuit 140*d* contains a sub-microprocessor SCPU therein, and in which, for example, a program memory 150*d*, being a flash memory, and an operation memory 151, being a RAM memory, are to cooperate with one another.

Besides, the above-mentioned monitoring control circuit 140*d* includes a drive output DR0 of the power supply relay, and this drive output DR0 comes to logic level "H" responsive to receiving a start signal ST generated by the drive control circuit 110*d*.

Numeral 148 designates a feed drive transistor the collector terminal of which is connected to the above-mentioned electromagnetic coil 108. Numeral 148*a* designates a feed-inhibit transistor connected to a base terminal of the above-mentioned feed drive transistor 148. When the above-mentioned feed drive output DR1 comes to logic level "H", the feed drive transistor 148 comes into conduction, and then the electromagnetic coil 108 is energized.

Numeral 152 designates a conduction inhibit resistor connected between a conduction-inhibit output SP6 of the above-mentioned monitoring control circuit 140*d* and a base terminal of a conduction-inhibit transistor 153. Numeral 153 designates a conduction-inhibit transistor connected to a base terminal of the above-mentioned transistor 117 acting as the driving switch element. When the above-mentioned conduction-inhibit output SP6 generates an inhibit output to come to logic level "H", or when the above-mentioned conduction-inhibit output SP3 generates an inhibit output to come to logic level "H", or when the above-mentioned error storage signal ERD comes to logic level "H", the conduction-inhibit transistor 153 comes into conduction; while the transistor 117 acting as a driving switch element is brought into non-conduction.

Numeral 154 designates a constant voltage diode having a voltage DR0*p* slightly larger than an output voltage from the above-mentioned control power supply 141. Numerals 155*a*, 155*b* designate voltage-dividing resistors. Numeral 156 designates a closed circuit detection circuit where the above-mentioned constant voltage diode 154 and the voltage dividing resistors 115*a*, 155*b* are connected in series. This close circuit detection circuit is connected to the battery 101 via the above-mentioned switch contact 109. A divided voltage provided by the voltage dividing resistors 155*a*, 155*b* is supplied to the above-mentioned drive control circuit 110*d* as a status signal S2.

Numeral 157 designates a resistor element connected to an output terminal of the above-mentioned control power supply 141. Numeral 158 designates a diode connected between this resistor element and a collector terminal of the above-mentioned transistor 117. Further a dummy load circuit is formed, in which a minute current flows from the control power supply 141 through the resistor element 157 and the diode 158 when the transistor 117 is energized.

Moreover, a connection point between the above-mentioned resistor element 157 and diode 158 is connected to the above-mentioned drive control circuit 110*d* as a status signal S1.

Numeral 159 designates a feed-inhibit resistor connected between a feed-inhibit output SP5 of the above-mentioned monitoring control circuit 140*d* and a base terminal of the above-mentioned feed-inhibit transistor 148*a*. When a feed-inhibit output SP5 is generated to come to logic level "H", the feed-inhibit transistor 148*a* comes into conduction, and the feed drive transistor 148 is brought into non-conduction to make the electromagnetic coil 108 de-energized.

Now, operations of the engine air-intake control device according to this fourth embodiment shown in FIG. 13 are described.

First, when the power supply switch 102 is brought into a closed circuit, the electromagnetic coil 103 of the power supply relay is energized resulting in a closed circuit of the switch contact 103*a*, and an electric power is fed to the control power supply 141 resulting in generation of a stabilized constant voltage DC 5V.

The drive control circuit 110*d* and monitoring control circuit 140*d* are fed with an electric power from the control power supply 141 to start operation, and the drive control circuit 110*d* supplies a start signal ST with respect to the monitoring control circuit 140*d*.

Figure 14:
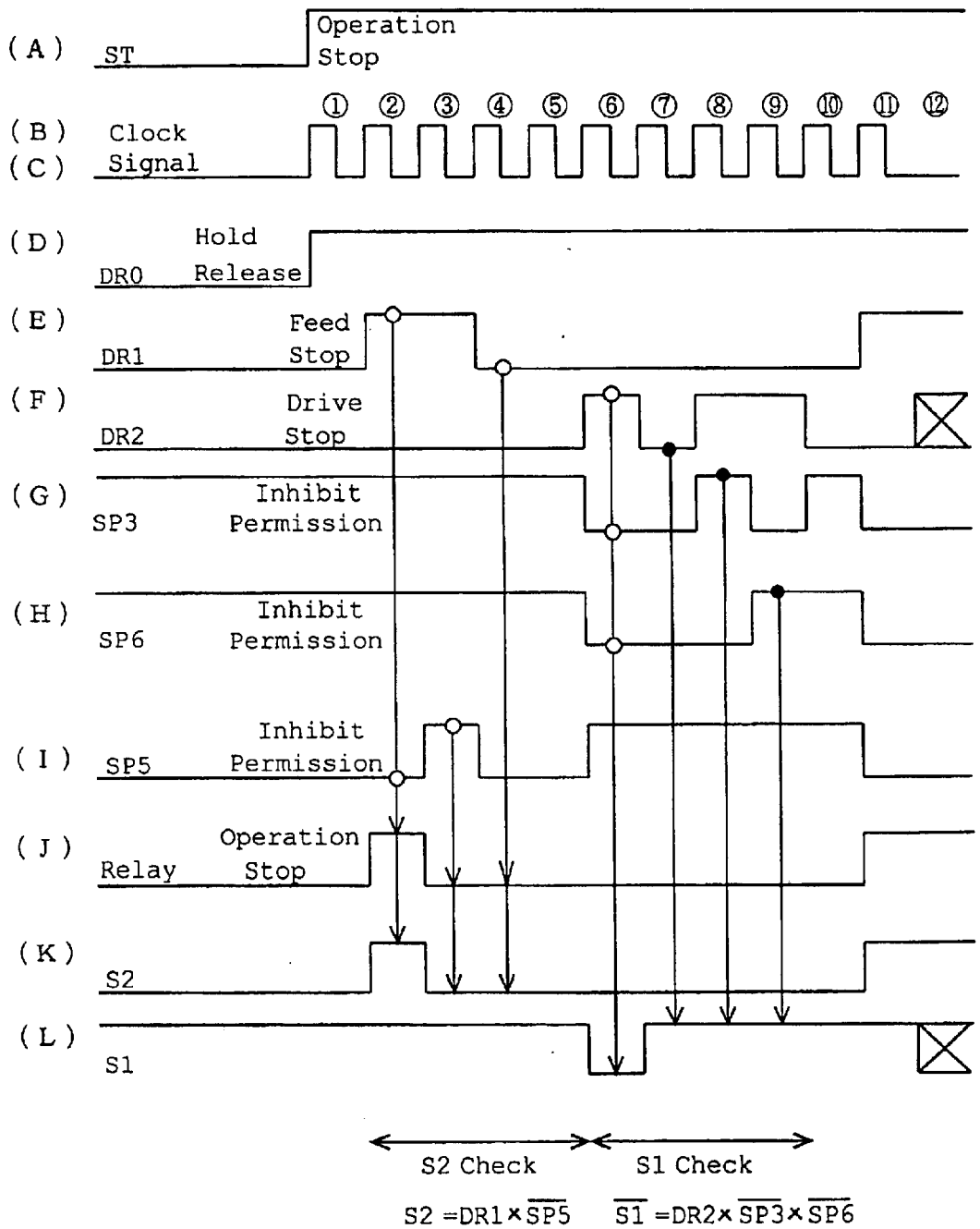
FIG. 14 is a time chart for explaining a startup sequence of the engine air-intake control device according to the fourth embodiment.

As a result, a drive output DR0 is generated, as well as a startup sequence, as described later with reference to FIG. 14, is carried out eventually coming to be in a normal operation state.

In the normal operation state, first the drive control circuit 110*d* generates the feed drive output DR1 to energize the electromagnetic coil 108 via the feed drive transistor 148.

Subsequently, the drive control circuit 110*d* shown in this fourth embodiment drives and controls the electrical load group 106 in accordance with an operation state of the switch sensor group 104 or the analog sensor group 105 and contents in the program memory 111*d*, as well as generates a conduction drive output DR2 in accordance with a detection output from the accelerator position sensor APS or the throttle position sensor TPS in the analog sensor group 105 and contents in the program memory 111*d*, and performs an ON/OFF ratio control of the transistor 117.

As a result, the motor 107 operates so that a throttle valve opening may correspond to a depression degree of the accelerator pedal.

On the other hand, the drive control circuit 110*d* carries out self diagnosis such as whether or not there is a disconnection and short circuit fault at, e.g., the accelerator position sensor APS and throttle position sensor TPS, or whether or not errors are present in data of the program memory 111*d*, or carries out monitoring on the other part such as whether or not a serial communication with the monitoring control circuit 140*c* is conducted normally. At the time of detecting any abnormality, the drive control circuit 110*d* stops a conduction drive output DR2, or generates the conduction-inhibit output SP3 to bring the transistor 117 into non-conduction. In addition, the drive control circuit 110*d* stops a feed drive output DR1 to bring the feed transistor 148 into non-conduction, and de-energizes the electromagnetic coil 108 to open a circuit of the switch contact 109, thereby interrupting a power supply circuit of the motor 107.

Likewise, the monitoring control circuit 140*d* monitors an operation state of the drive control circuit 110*d* while performing a data communication with the drive control circuit 110*d* via the serial communication circuit 113. At the time of detecting any abnormality, the monitoring control circuit 140*d* generates a conduction-inhibit output SP6 to bring the transistor 117 into non-conduction. In addition, monitoring control circuit 140*d* generates a feed-inhibit output SP5 to bring the feed-inhibit transistor 148*a* into conduction, resulting in interruption of a power supply circuit of the motor 107 via the feed drive transistor 148, electromagnetic coil 108 and switch contact 109.

Moreover, according to this fourth embodiment, it is arranged such that conduction inhibit control be carried out with the conduction-inhibit outputs SP3 and SP6 from both of the drive control circuit 110*d* and monitoring control circuit 140*d* with respect to the transistor 117. However, it is desirable that a power feed-inhibit can be performed by means of the monitoring control circuit 140*d*. To achieve this, a feed-inhibit output SP5 is added.

Furthermore, when current flowing through the current detection resistor 120 becomes excessively large due to, e.g., a short circuit fault at the motor 107 of a connection wiring, the comparison detection circuit 130*d* operates to generate an error storage signal ERD. Further the comparison detection circuit 130*d* opens a circuit of the transistor 148 by action of the feed-inhibit resistor 135 or the conduction inhibit resistor 136 to de-energize the electromagnetic coil 108, or brings the transistor 117 into non-conduction by means of the conduction-inhibit transistor 153.

Thus, the drive control circuit 110*d* can stop the motor 107 via the transistor 117 by stopping the conduction drive output DR2 or generating a conduction-inhibit output SP3. In addition, the drive control circuit 110*d* can interrupt a power supply circuit of the motor 107 via the transistor 148, electromagnetic coil 108 and switch contact 109 by stopping the feed drive output DR1.

Likewise, the monitoring control circuit 140*d* can interrupt a power supply circuit of the motor 107 via the feed-inhibit transistor 148*a*, the feed drive transistor 148, the electromagnetic coil 108 and the switch contact 109 by generating a feed-inhibit output SP5. In addition, the monitoring control circuit 140*d* can stop the motor 107 via the conduction-inhibit transistor 153 and the transistor 117 with a conduction-inhibit output SP6.

Meanwhile, at the startup of operation of the control device, presence or absence of any fault is discriminated by intentionally causing a feed drive output DR1, a feed-inhibit output SP5, a conduction drive output DR2 and conduction-inhibit outputs SP3 and SP6 to operate based on an startup sequence shown in FIG. 14 and monitoring status signals S1 and S2. Further an operation control starts after the absence of error has been confirmed.

FIG. 14 is a time chart for explaining the startup sequence of the control device (engine air-intake control device) 110*d* shown in FIG. 13.

With reference to FIG. 14, (A) is a start signal ST that the drive control circuit 110*d* generates. (B) is a clock signal generated in the drive control circuit 110*d* simultaneously with the generation of the start output ST. (C) is a clock signal generated in the monitoring control circuit 140*d* at the point of receiving the above-mentioned start signal ST. Although the foregoing clock signal (C) has a slight time delay with respect to the above-mentioned clock signal (B), it is represented so as to operate at the same timing as the above-mentioned clock signal (B) as a matter of convenience.

(D) indicates a drive output DR0 of the power supply relay that the monitoring control circuit 140*d* generates. This drive output DR0 is at logic level "H" from the point of rising edge of the first pulse of the above-mentioned clock signal (C) on.

(E) is a waveform of a feed drive output DR1 that the drive control 110*d* generates. (F) is a waveform of a conduction drive output DR2 that the drive control circuit 110*d* generates. (G) is a waveform of a conduction-inhibit output SP3 that the drive control circuit 110d generates. (H) is a waveform of a conduction-inhibit output SP6 that the monitoring control circuit 140d generates. (I) is a waveform of a feed-inhibit output SP5 that the monitoring control circuit 140d generates. These waveforms are changed to logic level "H" or "L" at the point of pulse rising edge of the clock signal (B) or (C).

(J) is a drive waveform of the electromagnetic coil 108 forming the load relay. (K) is a waveform of a status signal S2 inputted to the drive control circuit 110d. (L) is a waveform of a status signal S1 inputted to the drive control circuit 110d. These waveforms are changed to logic level "H" or "L" at the point of pulse rising edge of the clock signal (B).

Besides, the operation of a feed-inhibit output SP5 is confirmed during a time period from the second pulse to the fifth pulse of the clock waveform. During this time period, the status signal S1 is "H" continuously by making the conduction-inhibit output SP3="H" or the conduction-inhibit output SP6="H".

Furthermore, the case where the status signal S2="H" in this state is limited to the case where the feed drive output DR1="H", as well as the feed-inhibit output SP5="L". The status signal S2="L" in the case where The feed drive output DR1="L", or the feed-inhibit output SP5="H".

The operation of a conduction-inhibit output SP3 or SP6 is confirmed during a time period from the sixth pulse to the ninth pulse of the clock waveform. During this time period, the status signal S2="L" continuously by causing the feed-inhibit output SP5 to be "H".

Moreover, the case where the status signal S="L" in this state is limited to the case where the conduction drive output DR2="H", as well as the conduction-inhibit output SP3=SP6="L". The status signal S1="H" in the case where the conduction drive output DR2="L", the conduction-inhibit output SP3="H", or the conduction-inhibit output SP6="H". The tenth pulse of the clock waveform is to be in a standby state in which the feed drive output DR1="L", the feed-inhibit output SP5="H", the conduction drive output DR2="L", and the conduction-inhibit output SP3=SP6="H" thereby completing a startup sequence.

Figure 15:
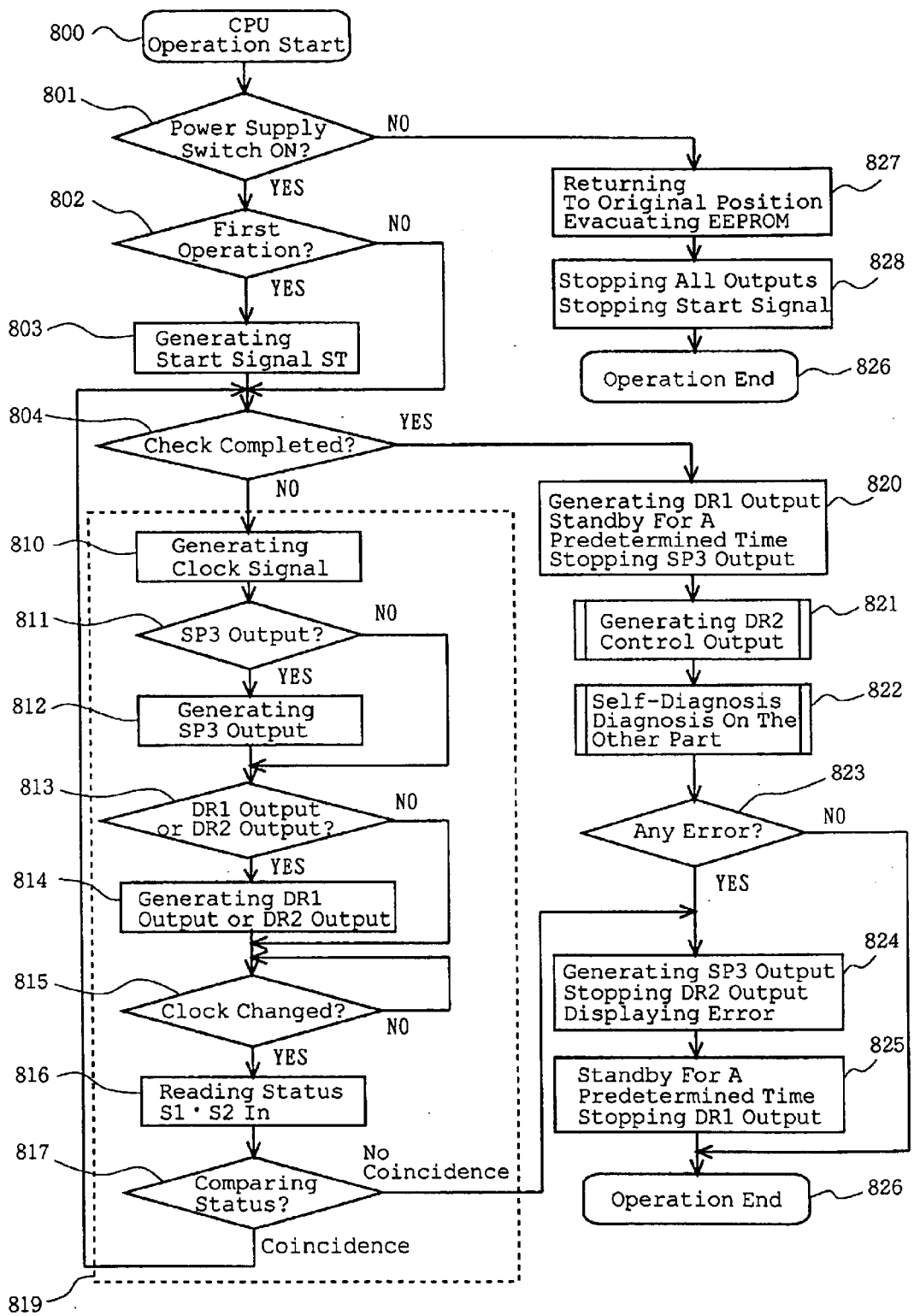
FIG. 15 is a flowchart for explaining a drive control operation of the engine air-intake control device according to the fourth embodiment.

FIG. 15 is a flowchart for explaining a drive control operation of the control device (engine air-intake control device) 100d shown in FIG. 13.

With reference to FIG. 15, numeral 800 is an operation start step of the microprocessor CPU in the drive control circuit 110d. Numeral 801 is a step that operates subsequently to step 800, and determines whether or not the power supply switch 102 is ON. Numeral 802 is a step that operates when step 801 determines YES, and discriminates whether or not it is the first operation depending on whether or not a start signal ST has been generated in the following step 803. Numeral 803 is a step that operates when step 602 discriminates the first operation, and generates a start signal ST. Numeral 804 is a step that operates when the above-mentioned step 802 discriminates that it is not the first operation, or subsequently to the above-mentioned step 803 or a step 817 as described later, and determines whether or not the clock waveform (B) of FIG. 14 has advanced until the completion of a startup sequence. This step 804 determines whether or not a clock counter, not shown, exceeds a count value of 10.

Numeral 810 is a step that operates when the above-mentioned step 804 determines non-completion, and generates a clock signal by one pulse. Numeral 811 is a step that operates subsequently to step 810, and discriminates whether or not it is timing of generating a conduction-inhibit output SP3 based on the time chart of FIG. 14. Numeral 812 is a step that operates when step 811 discriminates YES, and generates a conduction-inhibit output SP3. Numeral 813 is a step that operates when the above-mentioned step 811 discriminates NO, or subsequently to step 812, and discriminates whether or no it is timing of generating a feed drive output DR1 or a conduction drive output DR2 based on the time chart of FIG. 14. Numeral 814 is a step that operates when step 813 discriminates YES, and generates a feed drive output DR1 or a conduction drive output DR2. Numeral 815 is a determination standby step that operates when the above-mentioned step 813 discriminates NO, or subsequently to step 814, and stands by for operation until a current clock signal changes from logic level "H" to "L". Numeral 816 is a step that operates when step 815 determines the presence of change of a clock signal, and reads the status signals S1 and S2 in. Numeral 817 is a step that operates subsequently to step 816, and compares a logic level of a normal status signal having been preliminarily stored with a logic level having been read in by step 816. When this step 817 determines coincidence, the program proceeds to the above-mentioned step 804.

Numeral 819 is a step block formed of the above-mentioned steps 810 to 817. This step block represents steps of the operation start permission (that is, steps of operation start permission means in the drive control circuit 110d).

Numeral 820 is a step that operates subsequently to the above-mentioned step 804 when all the operations of the step block 819 acting as the above-mentioned operation start permission means have completed normally, and generates a feed drive output DR1. In addition, this step 820 performs the standby for a predetermined time period corresponding to a response time period from energization of the electromagnetic coil 108 until a complete closed circuit of the switch contact 109, and thereafter stops the conduction-inhibit output SP3 (at logic level "L") to bring the driving switch element 117 into a state capable of conduction. Numeral 821 is an automatic control step that operates subsequently to step 820, and responds to a detection output from the accelerator position sensor APS or throttle position sensor TPS in the analog sensor group 105 to generate a ratio control output of a conduction drive output DR2. Numeral 822 is a step that operates subsequently to step 821, and detects presence or absence of any error in a manner of self-diagnosis by means of the drive control circuit 110d or diagnosis on the other part with respect to the monitoring control circuit 140d.

Numeral 823 is a step that operates subsequently to the above-mentioned step 822, and determines whether or not any error has been detected by step 822. Numeral 824 is a step that operates when the above-mentioned step 817 determines non-coincidence resulted from comparison, or when the above-mentioned step 823 determines the presence of any error, and generates a conduction-inhibit output SP3 or stops a conduction control output DR2 to interrupt the transistor 117 as well as generates an error alarm display output with respect to the alarm display in the electrical load group 106. Numeral 825 is a step that operates subsequently to step 824, waits for a current attenuation time period of the motor 107, and stops a feed drive output DR1 to de-energize the electromagnetic coil 108 resulting in interruption of a power supply circuit of the motor 107. Numeral 826 is a standby step that operates when the above-mentioned step 623 determines the absence of the error, or subsequently to the above-mentioned step 825, and ends a periodical control operation. The microprocessor CPU constituting the drive control circuit 110d carries out other control operation, and thereafter activates the operation start step 800 again.

Numeral 827 is a step that operates when the above-mentioned step 801 determines that the power supply switch is OFF, and, e.g., causes a stepping motor for driving an exhaust gas recirculation valve to return to in an origin position, or stores and evacuates various learning information, error history information or the like, which is stored in the operation memory 112, with respect to the nonvolatile memory such as EEPROM memory, not shown, provided in the drive control circuit 110*d*. Numeral 828 is a step for stopping a start signal ST or all outputs that the drive control circuit 110*d* generates. Subsequently to this step 828, the program proceeds to the operation end step 626.

In addition, due to the fact that a start signal ST has been stopped in the above-mentioned step 828, the drive output DR0 of the power supply relay is stopped at the monitoring control circuit 140*d*, and the electromagnetic coil, which drives the switch contact 103*a*, is de-energized resulting in interruption of supplying a power supply with respect to the control device 100*d*.

Figure 16:
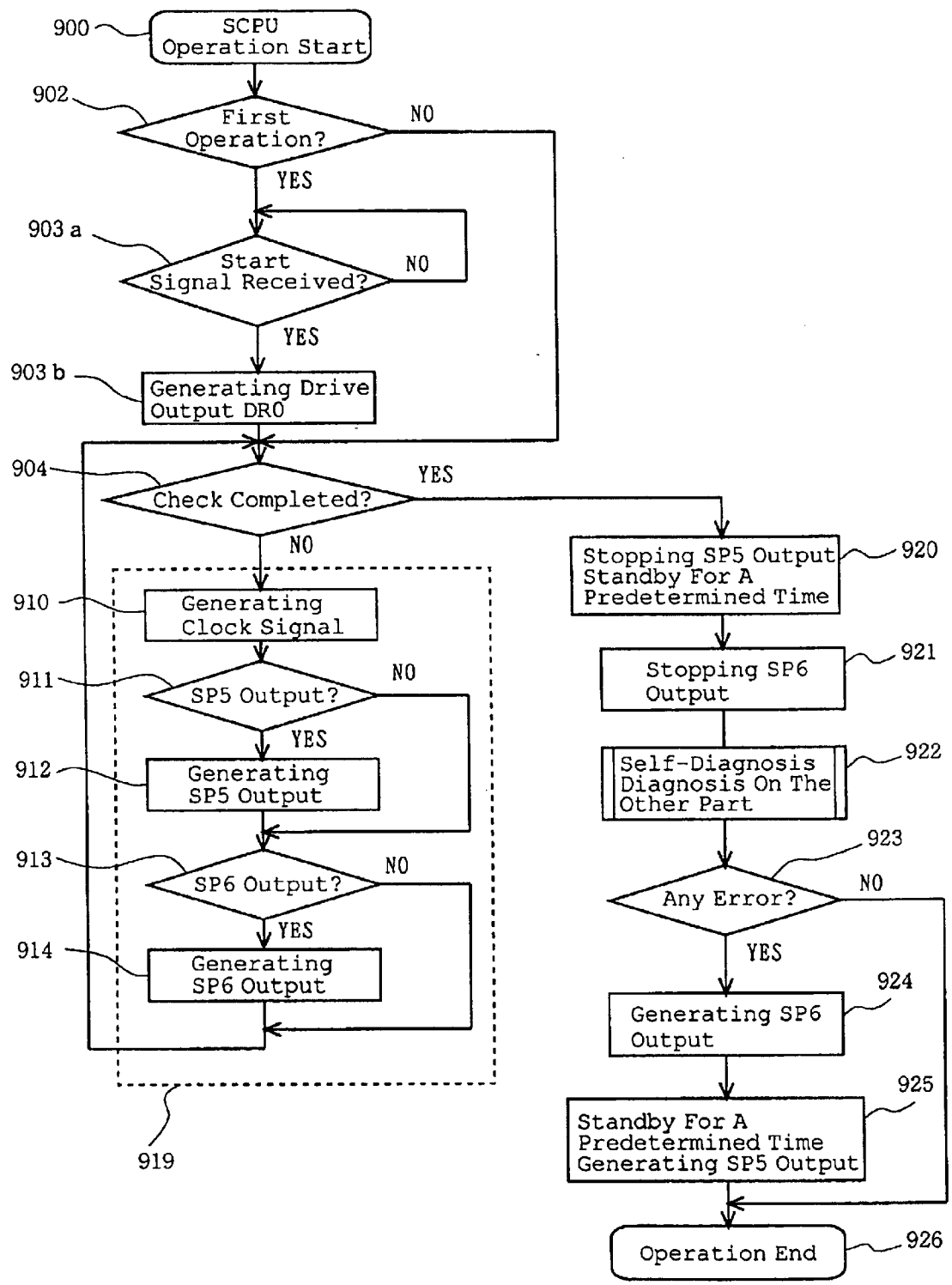
FIG. 16 is a flowchart for explaining a monitoring control operation of the engine air-intake control device according to the fourth embodiment.

FIG. 16 is a flowchart for explaining a monitoring control operation of a control device (engine air-intake control device) 100*d* shown in FIG. 13.

With reference to FIG. 16, Numeral 900 is an operation start step of a sub-microprocessor SCPU in the monitoring control circuit 140*d*. Numeral 902 is a step that operates subsequently to step 900, and discriminates whether or not it is the first operation depending on whether or not a drive output DR0 of the power supply has been generated in a step 903*b* as described later. Numeral 903*a* is a determination step that operates when step 902 determines the first operation, and performs the standby until receiving a start signal ST. Numeral 903*b* is a step that operates when the above-mentioned step 903*a* determines the completion of receiving, and generates a drive output DR0 of the power supply relay. Numeral 904 is a step that operates when the above-mentioned step 902 discriminates that it is not the first operation, or subsequently to the above-mentioned step 903*b* or a step 914 as described later, and determines whether or not the clock waveform (C) of FIG. 14 has advanced until the completion of a startup sequence. This step 904 determines whether or not a clock counter, not shown, exceeds a count value of 10.

Numeral 910 is a step that operates when the above-mentioned step 904 determines non-completion, and generates a clock signal by one pulse. Numeral 911 is a step that operates subsequently to step 910, and discriminates whether or not it is timing of generating a feed-inhibit output SP5 based on the time chart of FIG. 14. Numeral 912 is a step that operates when step 911 discriminates YES, and generates a feed-inhibit output SP5. Numeral 913 is a step that operates when the above-mentioned step 911 discriminates NO, or subsequently to step 912, and discriminates whether or not it is timing of generating a conduction-inhibit output SP6 based on the time chart of FIG. 14. Numeral 914 is a step that operates when step 913 discriminates YES, and generates a conduction-inhibit output SP6. When the above-mentioned step 913 discriminates NO, or subsequently to the above-mentioned step 914, the program proceeds to the above-mentioned step 904.

Numeral 919 is a step block formed of the above-mentioned steps 910 to 914. This step block 919 represents steps of operation start permission (that is, steps of operation start permission means at the monitoring control circuit 140*d*).

Numeral 920 is a step that operates subsequently to the above-mentioned step 904 when all the operations of the step block 919 for the above-mentioned operation start permission, and stops a feed-inhibit output SP5 to bring the electromagnetic coil 108 into a state capable of energizing. In addition, this step 920 performs the standby for a predetermined time period corresponding to a response time period from energization of the electromagnetic coil 108 until a complete closed circuit of the switch contact 109. Numeral 921 is a step that operates subsequently to step 920, and stops a conduction-inhibit output SP6 to bring the transistor 117 into a state capable of being conducted. Numeral 922 is a step that operates subsequently to step 921, and detects presence or absence of any error in a manner of self-diagnosis by means of the monitoring control circuit 140*d*, or diagnosis on the other part with respect to the drive control circuit 110*d*.

Numeral 923 is a step that operates subsequently to the above-mentioned step 922, and determines whether or not the error has been detected by step 922. Numeral 924 is a step that operates when the above-mentioned step 923 determines the presence of the error, and generates a conduction-inhibit output SP6 to interrupt the transistor 117. Numeral 925 is a step that operates subsequently to step 924, waits for a current attenuation time period of the motor 107, and generates a feed-inhibit output SP5 to de-energize the electromagnetic coil 108 resulting in interruption of a power supply circuit of the motor 107. Numeral 926 is a standby step that operates when the above-mentioned step 923 determines the absence of any error, or subsequently to the above-mentioned step 925, and ends a periodical control operation. The sub-microprocessor SCPU constituting the monitoring control circuit 140*d* carries out other control operations, and thereafter activates the operation start step 900 again.

<Additional Description>

As has been apparent from the above-described Embodiments 1 to 4, in a drive control device of a motor for controlling a throttle valve opening of an engine according to this invention, a drive control circuit and a monitoring control circuit are used together. In addition, a driving switch element and a power supply interruption element (that is, a load circuit power supply interruption element or a control circuit power supply interruption element) are used in combination, performing a generation/stopping of a conduction drive output and a generation/stopping control of a conduction-inhibit output with respect to the above-mentioned driving switch element, and further generation/stopping of a feed drive output and a generation/stopping control of a conduction-inhibit output with respect to the above-mentioned power supply interruption element. Thus, the motor is reliably stopped at the time of occurrence of any abnormality, thereby improving safety in the control.

Further, as partially illustrated in FIG. 5 according to the second embodiment, a drive output or an inhibit output can be made on the basis of either positive level or negative logic. For example, when a power feed drive is performed responsive to an AND output on the supposition that a feed drive output DR1, which the monitoring control circuit 140*b* generates, and a feed drive output obtained by regarding a feed-inhibit output SP1, which the drive control circuit 110*b* generates, are the second power feed drive output, it is possible to regard one of the mentioned power feed outputs as a power feed-inhibit output relative to the other power feed drive output. Both drive output and inhibit output may have the same meaning depending on whether the logic is positive or negative.

Likewise, by causing error storage signals ER and ERD to operate at a negative logic, the logic level comes to "L" at the time of storing the error and it is possible to change a circuit for performing the power feed-inhibit or conduction-inhibit.

According to this invention, the side that generates conduction drive output in order to perform an ON/OFF ratio control is referred to as the drive control circuit. Whereas, the monitoring control circuit generates a power feed drive output in the first embodiment (FIG. 1) and the second embodiment (FIG. 5), and the drive control circuit also generates a feed drive output in the third embodiment (FIG. 9) and the fourth embodiment (FIG. 13).

As for the feed drive output, essentially it is rational that the control circuit, being the side having an initiative over the whole control generates this feed drive output. However, even on the side of the monitoring control circuit having no initiative, in the first embodiment (FIG. 1), it is arranged such that a feed drive output DR1 is outputted from the drive control circuit 110a via the monitoring control circuit 140a through the serial communication circuit 113. The generation of the feed drive output DR1 shows an evidence for normal performance of the serial communication.

Moreover, in the case where one of the drive control circuit and monitoring control circuit generates a drive output, it is a principle that the other control circuit generates an inhibit output.

Nevertheless, as shown in the fourth embodiment (FIG. 13), it is possible to arrange such that the drive control circuit 110d generates a conduction drive output DR2 and a conduction-inhibit output SP3. Other than the combination of embodiments shown in the drawings, it is preferable to have such redundancy that the drive control circuit or monitoring control circuit be provided with a feed-inhibit output or conduction-inhibit output in a duplicate manner, and the power feed-inhibit or conduction inhibit be performed from either of the control circuit sides.

As for a driving switch element employed in this invention, instead of an NPN-type bipolar transistor as shown, a PNP-type bipolar transistor, an N channel-type or P channel-type field effect transistor or the like is applicable.

Furthermore, as to a load circuit power supply interruption element, instead of the switch contact in the electromagnetic relay, a PNP-type or NPN-type bipolar transistor, an N channel-type or P channel-type field effect transistor, or the like is applicable. The transistor of FIG. 9 shows one example thereof.

In addition, in the embodiments as shown above, the motor 107 of a type that is driven in one way against a spring for closing a throttle valve is described. However, in the case of a motor that is driven so as to rotate reversibly in both directions of opening and closing the throttle valve, an H-bridge-type motor driver is used.

In this case, it may be arranged such that a transistor on the positive side of the bridge performs positioning of the transistor 170 in FIG. 9 to act as a load circuit power supply interruption element, and a transistor on the negative side of the bridge performs positioning of the driving switch element 117 of FIG. 9.

As a drive control circuit used in this invention, there is a type specialized in the conduction control of the motor 107, or any other type including an engine control function such as ignition control of engine, fuel injection control, and control of the transmission.

Further, the monitoring control circuit used in this invention communicates with the drive control circuit via the serial communication circuit, and monitors at least the control operation of the drive control circuit. There is a type of such monitoring control circuit that includes a logic circuit having no microprocessor and any other type thereof that includes a sub-microprocessor specialized in monitoring the control. There is still further type thereof that includes an engine control function such as ignition control of the engine, fuel injection control, control of the transmission.

In the case where the drive control circuit or monitoring control circuit includes an engine control function by means of a microprocessor, if the microprocessor should temporarily run away, e.g., due to influence of noise, it is usual to immediately start up the microprocessor to control to continue operation of the engine as long as possible.

However, as for the control of a throttle valve opening, there is one idea in which the control of the motor is stopped until the power supply switch is turned on again after occurrence of any error to carry out an evacuation operation in a state of the opening of a throttle valve having returned to in an initial position mechanically, or another idea in which the motor control is restored after recovery from the error. The invention contains either of the mentioned two ideas.

The electromagnetic coil 103 of the power supply relay shown in FIG. 1 is arranged so as to be connected to the battery 101 via the diode 103b from the power supply switch 102 as well as connected to the battery 101 via the diode 103c from the switch contact 103a. Further connection between the battery 101 and the control device 100a is arranged to separate completely after stopping the operation.

However, in the case of intending to store and hold a part of contents in the operation memory 112, being a RAM memory, even during the operation being stopped, it is also possible to provide a sleep power supply circuit connected directly from the battery 101 to the control device 100a without the power supply switch 102.

Although the electromagnetic coil 103 of the power supply relay in FIG. 9 is directly connected between the transistor 143 and the battery 101, the transistor 143 in this connection employs a transistor where there is not much open-circuit leak current (dark current). This results in reduction in battery load when the operation is stopped.

Furthermore, a power supply relay shown in each embodiment is the one that is provided with a delay interruption function at the time of stopping the operation. However, in the case of any application in which there is no stepping motor requiring mechanical return to the origin and an evacuation processing time period is short after stopping the operation, a power supply relay intending to perform the delay interruption becomes unnecessary just by increasing capacity of the capacitor, which is provided at the input/output section of the control power supply 141, is sufficient.

In each embodiment described above, simulation of the drive output or inhibit output and discrimination of the status signal corresponding to the simulation before coming into normal operation state are carried out in accordance with a predetermined procedure. Therefore, each embodiment is simplified so that it may be unnecessary for the drive control circuit side and monitoring control circuit side to cooperate with each other via the serial communication circuit 113 thereby monitoring an output state of the other side.

However, for the purpose of performing confirmation of operation of the serial communication circuit 113, for example, it is preferable that the drive control circuit side has an initiative to generate in sequence a drive output or inhibit output while giving any command to the monitoring control circuit side, and that the drive control side carries out error determination in a manner of fetching a status signal, which is inputted to the monitoring control side, into the drive control side via the serial communication circuit.

Finally, features of the present invention based on the engine air-intake control device according to the foregoing first embodiment to the fourth embodiment, or the combination thereof are described.

An engine air-intake control device according to this invention includes:

a driving switch element that is connected in series to a motor, which controls an opening of an intake valve of an engine responsive to a detection output from an accelerator position sensor and a throttle position sensor and controls a conduction current of the mentioned motor;

a power supply interruption element acting as a load circuit power supply interruption element connected to a power supply circuit of mentioned motor or as a control circuit power supply interruption element connected to a conduction controlling power supply circuit of the driving switch element;

a drive control circuit for generating a conduction drive output in order to control conduction to the driving switch element responsive to a detection output of the accelerator position sensor and the throttle position sensor;

a monitoring control circuit that is connected via a serial communication circuit with respect to the mentioned drive control circuit and monitors operation of the mentioned drive control circuit; and status signal detection means for detecting an operation state of the mentioned driving switch element and the mentioned power supply interruption element and for supplying a status signal corresponding to the operation state to the mentioned drive control circuit or the mentioned monitoring control circuit.

Further, the mentioned drive control circuit and monitoring control circuit cooperate with each other in accordance with a detection result of the mentioned status signal detection means to generate in a sharing manner a feed drive output in order to bring the mentioned power supply interruption element into operation, a feed-inhibit output in order to make this feed drive output reactive, and a conduction-inhibit output in order to make the mentioned conduction drive output reactive, and causes the foregoing outputs to stop or permit operation of the mentioned power supply interruption element and driving switch element.

As a result, it is possible to reliably stop the drive of the motor at the time of occurrence of any abnormality thereby enabling to improve safety in the control.

Further, in the engine air-intake control device according to this invention, the load circuit power supply interruption element is a load relay formed of: a switch contact, which is connected in series to the motor; and an electromagnetic coil, which is controlled with a feed drive output and causes the mentioned switch contact to open and close. The engine air-intake control device according to this invention further includes: a dummy load circuit formed of a resistor element and a diode, which energizes the driving switch element from a control power supply; and a connection point electric potential between the mentioned resistor element and diode is supplied to the drive control circuit or the monitoring control circuit as a status signal for monitoring operation of the mentioned driving switch element.

As a result, since the power supply of the motor can be interrupted by means of the switch contact of the load relay, there is no leak current at the time of stopping operation, thereby enabling to reduce discharge amount of the battery as well as enabling to confirm operation state of the driving switch element in a state that the switch contact is in an open circuit.

Moreover, the engine air-intake control device according to this invention includes: a closed-circuit detection circuit, which is brought into conduction due to closed circuit of the switch contact of the load relay; and a generation voltage of this closed-circuit detection circuit is supplied to the drive control circuit or the monitoring control circuit as a status signal for detecting operation state of the switch contact of the load relay. As a result, it is possible to monitor a conduction state of the switch contact forming the load relay.

Besides, the engine air-intake control device according to this invention includes: preceding turning-on means for making a conduction drive output active after a predetermined time period has passed from a feed drive output being active; and delay interruption means for stopping a feed drive output or making a feed-inhibit output active after a predetermined time period has passed from stopping a conduction drive output or generating a conduction-inhibit output. As a result, it becomes possible to perform an open/close operation of the switch contact in a state of no load, thereby enabling to extend life of the switch contact.

In addition, the engine air-intake control device according to this invention includes: a power supply relay formed of a switch contact connected in series with respect to a power supply circuit relative to the motor, and an electromagnetic coil that is energized via a power supply switch and causes the switch contact to open and close; and a control circuit power supply interruption element formed of a transistor that is brought into conduction in response to the feed drive output to close the controlling power supply circuit of the driving switch element; and in which electric potential of an output circuit of the transistor is supplied to the drive control circuit or monitoring control circuit as one of the status signals.

As a result, even if the control circuit power supply interruption element is employed, any leak current is not produced at the time of stopping operation, thereby enabling to reduce discharge amount of the battery as well as to monitor operation state of the control circuit power supply interruption element.

Further, the engine air-intake control device according to this invention includes: voltage-dividing resistors that divide voltage across the driving switch element, and in which a divided voltage provided by these voltage dividing resistors is supplied to the drive control circuit or monitoring control circuit as one of the status signals. As a result, it becomes possible to carry out operation monitoring of the driving switch element with a divided voltage, and additionally to detect presence or absence of any disconnection fault of the motor or the connection wiring of the motor.

Furthermore, in the engine air-intake control device according to this invention, the drive control circuit generates a conduction drive output in order to perform an ON/OFF ratio control of the driving switch element responsive to a detection output from the accelerator position sensor and throttle position sensor, and a feed-inhibit output in order to make a feed drive output, which the monitoring control circuit generates, reactive; and stops a conduction drive output when generating the foregoing feed-inhibit output;

the monitoring control circuit generates a feed drive output in order to act on the power supply interruption element and open/close a power supply circuit, and a conduction-inhibit output in order to make a conduction drive output, which the drive control circuit generates, reactive; and stops a feed drive output when generating the foregoing conduction-inhibit output; and the feed-inhibit output or conduction-inhibit output is operated in a manner of self-diagnosis function and mutual diagnosis function by means of the mentioned drive control circuit and monitoring control circuit.

As a result, both of the transistor acting as a control circuit power supply interruption element and the driving switch element can be interrupted by means of either the drive control circuit or the monitoring control circuit, thereby enabling to improve safety in the control.

Further, in the case where the power supply interruption element is a switch contact of the electromagnetic relay, the switch contact can be brought into open/close operation in a state of no load without mutual cooperation between the drive control circuit and monitoring control circuit with each other, thereby enabling to extend life of the switch contact.

Furthermore, in the engine air-intake control device according to this invention, the drive control circuit or monitoring control circuit to which a status signal is supplied, includes operation start permission means that compares a logic state of a status signal in each time step preliminarily stored with an actual logic state of a status signal in each time step, and stores non-coincidence as a result of comparison at the time of non-coincidence to continuously generate a conduction-inhibit output or feed-inhibit output; and confirms that a feed-inhibit output circuit and conduction-inhibit output circuit function effectively, and thereafter stops respective inhibit outputs to make a feed drive output and a conduction drive output active at the startup of operation.

As a result, at the startup of operation, it is possible to confirm that a feed-inhibit output circuit and conduction-inhibit output circuit function effectively, and thereafter stop respective inhibit outputs to make a feed drive output and conduction drive output active thereby enabling to improve safety.

Further, in the engine air-intake control device according to this invention, the drive control circuit generates a conduction drive output in order to perform an ON/OFF ratio control of the driving switch element responsive to a detection output from the accelerator position sensor and throttle position sensor, and a feed drive output in order to act on the driving switch element, and open and close a power supply circuit;

the monitoring control circuit generates a conduction-inhibit output in order to make a conduction drive output reactive, which the mentioned drive control circuit generates, and a feed-inhibit output in order to make a feed drive output reactive, which the drive control circuit generates; and the feed-inhibit output or conduction-inhibit output is operated in a manner of self-diagnosis function and mutual diagnosis function by means of the mentioned drive control circuit and monitoring control circuit.

As a result, both the power supply interruption element and the driving switch element can be interrupted by either the drive control circuit or monitoring control circuit, thereby enabling to improve safety in the control.

Furthermore, in the case where the power supply interruption element is a switch contact of the electromagnetic relay, the switch contact can be brought into open/close operation in a state of no load without mutual cooperation between the drive control circuit and monitoring control circuit, thereby enabling to extend life of the switch contact.

Besides, in the engine air-intake control device according to this invention, the monitoring control circuit 140c to which a status signal is supplied, includes operation start permission means that compares a logic state of a status signal in each time step having been preliminarily stored with an actual logic state of a status signal in each time step, and stores non-coincidence as a result of comparison at the time of this non-coincidence to continuously generate at least one of a conduction-inhibit output and a feed-inhibit output; and confirms that a feed-inhibit output circuit and conduction-inhibit output circuit function effectively, and thereafter stops respective inhibit outputs to make a feed drive output and a conduction drive output active upon startup of the operation.

As a result, at the startup of operation, it is possible to confirm that a feed-inhibit output circuit and a conduction-inhibit output circuit function effectively, and thereafter stop respective inhibit outputs to make a feed drive output and conduction drive output active resulting in improvement in safety.

Furthermore, in the engine air-intake control device according to this invention, the drive control circuit generates a conduction drive output in order to perform an ON/OFF ratio control of the driving switch element responsive to a detection output from the accelerator position sensor and throttle position sensor, a first conduction-inhibit output in order to make a conduction drive output reactive, and a feed drive output in order to act on the power supply interruption element and open and close a power supply circuit; and stops the mentioned feed drive output and conduction drive output at the time of generating the first conduction-inhibit output;

the monitoring control circuit generates a second conduction-inhibit output in order to make a conduction drive output reactive, which the drive control circuit 110d generates; and the first conduction-inhibit output and the second conduction-inhibit output are operated in a manner of self-diagnosis function and mutual diagnosis function by means of the mentioned drive control circuit and monitoring control circuit.

As a result, at the time of the occurrence of abnormality, it is possible to interrupt the driving switch element to stop the motor 107 from either of the drive control circuit or monitoring control circuit, as well as to interrupt a power supply interruption element by means of the drive control circuit resulting in improvement in safety of control.

Besides, in the engine air-intake control device according to this invention, the drive control circuit or monitoring control circuit to which a status signal is supplied includes operation start permission means that compares a logic state of a status signal in each time step having been preliminarily stored with an actual logic state of a status signal in each time step, and stores non-coincidence as a result of comparison at the time of this non-coincidence to continuously generate a first conduction-inhibit output or a second conduction-inhibit output; and confirms that a first conduction-inhibit output circuit and a second conduction-inhibit output function effectively, and thereafter stops respective conduction-inhibit outputs to make a feed drive output and a conduction drive output active at the startup of operation.

As a result, at the startup of operation, it is possible to confirm that the first conduction-inhibit output and second conduction-inhibit output circuits function effectively, and thereafter stop respective inhibit outputs to make a feed drive output and conduction drive output active resulting in improvement in safety.

Besides, in the engine air-intake control device according to this invention, the monitoring control circuit generates a feed-inhibit output in order to make reactive a feed drive output which the drive control circuit generates.

As a result, it is possible to interrupt both the power supply interruption element and driving switch element by either the drive control circuit or monitoring control circuit, thereby enabling to improve safety in the control.

Further, in the case where the power supply interruption element is a switch contact of the electromagnetic relay, it is possible to bring the switch contact into open/close operation in a state of no load without mutual cooperation between the drive control circuit and monitoring control circuit, thereby enabling to extend life of the switch contact.

Besides, in the engine air-intake control device according to this invention, the drive control circuit or monitoring control circuit to which a status signal is supplied includes operation start permission means that compares a logic state of a status signal in each time step having been preliminarily stored with an actual logic state of a status signal in each time step, and stores non-coincidence as a result of comparison at the time of this non-coincidence to continuously generate a first and second conduction-inhibit outputs or a feed-inhibit output; and confirms that mentioned first and second conduction-inhibit output circuits or a feed-inhibit output circuit function effectively, and thereafter stops respective inhibit outputs to make a feed drive output and a conduction drive output active at the startup of operation.

As a result, at the startup of operation, it is possible to confirm that the first and second conduction-inhibit output circuits and the feed-inhibit output circuit function effectively, and thereafter stop respective inhibit outputs to make a feed drive output and conduction drive output active, thereby obtaining an advantage of improvement in safety.

Further, in the engine air-intake control device according to this invention, at least one of the drive control circuit or the monitoring control circuit includes: a microprocessor; a watchdog timer that monitors a watchdog signal, which is a pulse train generated by the microprocessor, and generates a reset output pulse when a pulse width of this watchdog signal is larger than a predetermined value to cause the mentioned microprocessor to start up again; and an error storage circuit, which stores therein that the mentioned reset pulse output has been generated or that number of reset pulse generations has reached a predetermined value to make at least one of the mentioned conduction drive output and feed drive output reactive, and in which the mentioned storage state is reset when a power supply switch is turned on.

As a result, it is possible to immediately start up the microprocessor again and continue the operation even if any runaway error occurs at the microprocessor, and to stop driving and controlling the motor until the power supply is turned on again, thereby enabling to improve safety all the more.

Furthermore, in the engine air-intake control device according to this invention includes a comparison detection circuit that generates an over-current detection output when voltage across a current detection resistor, which is connected in series to an armature circuit of the motor, exceeds a predetermined value, and stores the operation of this over-current detection output to make at least one of the conduction drive output and the feed drive output reactive.

As a result, in the case of occurrence of, e.g., short circuit error at the motor circuit, the driving switch element or the power supply interruption element is immediately interrupted, thereby enabling to prevent the driving switch element or power supply interruption element from being burnt out.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. An engine air-intake control device according to this invention includes:
   a driving switch element that is connected in series to a motor, which controls an opening of an intake valve of an engine responsive to a detection output from an accelerator position sensor and a throttle position sensor, and controls a conduction current of said motor;
   a power supply interruption element acting as a load circuit power supply interruption element connected to a power supply circuit of said motor, or as a control circuit power supply interruption element connected to a conduction controlling power supply circuit of said driving switch element;
   a drive control circuit for generating a conduction drive output in order to control conduction to said driving switch element responsive to a detection output of said accelerator position sensor and throttle position sensor;
   a monitoring control circuit that is connected via a serial communication circuit with respect to said drive control circuit, and monitors operation of said drive control circuit; and
   status signal detection means for detecting an operation state of said driving switch element and said power supply interruption element, and for supplying a status signal corresponding to the operation state to said drive control circuit or said monitoring control circuit;
   wherein said drive control circuit and monitoring control circuit cooperate with each other in accordance with a result of detection of said status signal detection means to generate in a sharing manner a feed drive output in order to bring said power supply interruption element into operation, a feed-inhibit output in order to make said feed drive output reactive, and a conduction-inhibit output in order to make said conduction drive output reactive, whereby said outputs are caused to perform an operation stop or an operation permission of said power supply interruption element and said driving switch element.

2. The engine air-intake control device according to claim 1, wherein said load circuit power supply interruption element is a load relay comprised of a switch contact, which is connected in series to said motor, and an electromagnetic coil, which is controlled with said feed drive output and causes said switch contact to open and close;
   the engine air-intake control device further comprising: a dummy load circuit formed of a resistor element and a diode, which energizes said driving switch element from a control power supply; and
   in which a connection point electric potential between said resistor element and diode is supplied to said drive control circuit or said monitoring control circuit as a status signal for monitoring operation of said driving switch element.

3. The engine air-intake control device according to claim 2, further comprising: a closed-circuit detection circuit, which is brought into conduction due to closed circuit of the switch contact of said load relay;
   wherein a generation voltage of said closed-circuit detection circuit is supplied to said drive control circuit or said monitoring control circuit as a status signal for detecting operation state of the switch contact of said load relay.

4. The engine air-intake control device according claim 2, further comprising:
   preceding turning-on means for making a conduction drive output active after a predetermined time period has passed from said feed-drive output being active; and delay interruption means for stopping a feed drive output or making a feed-inhibit output active after a predetermined time period has passed from stopping said conduction drive output or generating a conduction-inhibit output.

5. The engine air-intake control device according to claim 2, wherein at least one of said drive control circuit or the monitoring control circuit includes:

a microprocessor;

a watchdog timer that monitors a watchdog signal, which is a pulse train generated by said microprocessor, and generates a reset out-put pulse when a pulse width of said watchdog signal is larger than a predetermined value to cause said microprocessor to start up again; and an error storage circuit, which stores therein that said reset pulse output has been generated or that number of reset pulse generations has reached a predetermined value to make at least one of said conduction drive output and feed drive output reactive, and in which said storage state is reset when a power supply switch is turned on.

6. The engine air-intake control device according to claim 1, further comprising:

a power supply relay formed of a switch contact connected in series with respect to a power supply circuit relative to said motor, and an electromagnetic coil that is energized via a power supply switch and causes said switch contact to open and close; and a control circuit power supply interruption element formed of a transistor that is brought into conduction in response to said feed drive output to close a controlling power supply circuit of said driving switch element;

wherein electric potential of said output circuit of the transistor is supplied to said drive control circuit or said monitoring control circuit as one of the status signals.

7. The engine air-intake control device according to claim 6, further comprising voltage-dividing resistors that divide voltage across said driving switch element, wherein a divided voltage provided by said voltage dividing resistors is supplied to said drive control circuit or said monitoring control circuit as one of the status signals.

8. The engine air-intake control device according to claim 6, wherein at least one of said drive control circuit or the monitoring control circuit includes:

a microprocessor;

a watchdog timer that monitors a watchdog signal, which is a pulse train generated by said microprocessor, and generates a reset output pulse when a pulse width of said watchdog signal is larger than a predetermined value to cause said microprocessor to start up again; and an error storage circuit, which stores therein that said reset pulse output has been generated or that number of reset pulse generations has reached a predetermined value to make at least one of said conduction drive output and feed drive output reactive, and in which said storage state is reset when a power supply switch is turned on.

9. The engine air-intake control device according to claim 1, wherein said drive control circuit generates a conduction drive output in order to perform an ON/OFF ratio control of said driving switch element responsive to a detection output from said accelerator position sensor and throttle position sensor and a feed-inhibit output in order to make a feed drive output, which said monitoring control circuit generates, reactive, and stops a conduction drive output when generating said feed-inhibit output;

said monitoring control circuit generates a feed drive output in order to act on said power supply interruption element and open/close a power supply circuit and a conduction-inhibit output in order to make a conduction drive output, which said drive control circuit generates, reactive, and stops a feed drive output when generating said conduction-inhibit output; and said feed-inhibit output or said conduction-inhibit output is operated in a manner of self-diagnosis function and mutual diagnosis function by means of said drive control circuit and the monitoring control circuit.

10. The engine air-intake control device according to claim 9, wherein the drive control circuit or monitoring control circuit to which said status signal is supplied, includes operation start permission means that compares a logic state of a status signal in each time step preliminarily stored with an actual logic state of a status signal in each time step, and stores non-coincidence as a result of comparison at the time of non-coincidence to continuously generate a conduction-inhibit output or feed-inhibit output; and confirms that a feed-inhibit output circuit and conduction-inhibit output circuit function effectively, and thereafter stops respective inhibit outputs to make a feed drive output and a conduction drive output active at the startup of operation.

11. The engine air-intake control device according to claim 9, wherein at least one of said drive control circuit or the monitoring control circuit includes:

a microprocessor;

a watchdog timer that monitors a watchdog signal, which is a pulse train generated by said microprocessor, and generates a reset output pulse when a pulse width of said watchdog signal is larger than a predetermined value to cause said microprocessor to start up again; and an error storage circuit, which stores therein that said reset pulse output has been generated or that number of reset pulse generations has reached a predetermined value to make at least one of said conduction drive output and feed drive output reactive, and in which said storage state is reset when a power supply switch is turned on.

12. The engine air-intake control device according to claim 1, wherein said drive control circuit generates a conduction drive output in order to perform an ON/OFF ratio control of said driving switch element responsive to a detection output from said accelerator position sensor and throttle position sensor, and a feed drive output in order to act on said driving switch element, and open and close a power supply circuit;

said monitoring control circuit generates a conduction-inhibit output in order to make a conduction drive output reactive, which said drive control circuit generates, and a feed-inhibit output in order to make a feed drive output reactive, which said drive control circuit generates; and said feed-inhibit output or a conduction-inhibit output is operated in a manner of self-diagnosis function and mutual diagnosis function by means of said drive control circuit and monitoring control circuit.

13. The engine air-intake control device according to claim 12, wherein the monitoring control circuit 140c to which said status signal is supplied includes operation start permission means that compares a logic state of a status signal in each time step having been preliminarily stored with an actual logic state of a status signal in each time step, and stores non-coincidence as a result of comparison at the time of the non-coincidence to continuously generate at least one of a conduction-inhibit output and a feed-inhibit output; and confirms that a feed-inhibit output circuit and a conduction-inhibit output circuit function effectively, and thereafter stops respective inhibit outputs to make a feed drive output and a conduction drive output active upon startup of the operation.

14. The engine air-intake control device according to claim 1, wherein said drive control circuit generates a conduction drive output in order to perform an ON/OFF ratio control of said driving switch element responsive to a detection output from said accelerator position sensor and throttle position sensor, a first conduction-inhibit output in order to make a conduction drive output reactive, and a feed drive output in order to act on said power supply interruption element and open and close a power supply circuit; and stops said feed drive output and said conduction drive output at the time of generating said first conduction-inhibit output;

said monitoring control circuit generates a second conduction-inhibit output in order to make a conduction drive output reactive, which said drive control circuit 110d generates; and said first conduction-inhibit output and the second conduction-inhibit output are operated in a manner of self-diagnosis function and mutual diagnosis function by means of said drive control circuit and monitoring control circuit.

15. The engine air-intake control device according to claim 14, wherein the drive control circuit or monitoring control circuit to which said status signal is supplied includes operation start permission means that compares a logic state of a status signal in each time step having been preliminarily stored with an actual logic state of a status signal in each time step, and stores non-coincidence as a result of comparison at the time of the non-coincidence to continuously generate a first conduction-inhibit output or a second conduction-inhibit output; and confirms that a first conduction-inhibit output circuit and a second conduction-inhibit output function effectively, and thereafter stops respective conduction-inhibit outputs to make a feed drive output and a conduction drive output active at the startup of operation.

16. The engine air-intake control device according to claim 14, wherein said monitoring control circuit generates a feed-inhibit output in order to make reactive a feed drive output which said drive control circuit generates.

17. The engine air-intake control device according to claim 16, wherein the drive control circuit or monitoring control circuit to which said status signal is supplied includes operation start permission means that compares a logic state of a status signal in each time step having been preliminarily stored with an actual logic state of a status signal in each time step, and stores non-coincidence as a result of comparison at the time of this non-coincidence to continuously generate a first and second conduction-inhibit outputs or a feed-inhibit output; and confirms said first and second conduction-inhibit output circuits or a feed-inhibit output circuit function effectively, and thereafter stops respective inhibit outputs to make a feed drive output and a conduction drive output active at the startup of operation.

18. The engine air-intake control device according to claim 1, wherein at least one of said drive control circuit or the monitoring control circuit includes:

a microprocessor;

a watchdog timer that monitors a watchdog signal, which is a pulse train generated by said microprocessor, and generates a reset output pulse when a pulse width of said watchdog signal is larger than a predetermined value to cause said microprocessor to start up again; and an error storage circuit, which stores therein that said reset pulse output has been generated or that number of reset pulse generations has reached a predetermined value to make at least one of said conduction drive output and feed drive output reactive, and in which said storage state is reset when a power supply switch is turned on.

19. The engine air-intake control device according to claim 1, further comprising a comparison detection circuit that generates an over-current detection output when voltage across a current detection resistor, which is connected in series to an armature circuit of said motor, exceeds a predetermined value, and stores the operation of said over-current detection output to make at least one of said conduction drive output and the feed drive output reactive.

20. An engine air-intake control method implemented in the engine air-intake control device according to claim 1, wherein the drive control circuit and monitoring control circuit carry out the operation stop or operation permission of said power supply interruption element and said driving switch element in a mutual sharing and cooperative manner in response to a status signal showing an operation state of the driving switch element that controls a conduction current of the motor and the power supply interruption element that switches a power supply of the motor or a power supply of the control circuit.

* * * * *